US009445017B2

(12) United States Patent
Konishi et al.

(10) Patent No.: US 9,445,017 B2
(45) Date of Patent: Sep. 13, 2016

(54) NEAR-INFRARED CUT FILTER AND SOLID-STATE IMAGING DEVICE

(71) Applicant: ASAHI GLASS COMPANY, LIMITED, Chiyoda-ku (JP)

(72) Inventors: Teppei Konishi, Koriyama (JP);
Hiroyuki Arishima, Koriyama (JP);
Kazuhiko Shiono, Koriyama (JP);
Hiroki Hotaka, Koriyama (JP);
Makoto Hasegawa, Tokyo (JP);
Hiroshi Shimoda, Tokyo (JP); Atsushi Komori, Tokyo (JP); Aya Ikoma, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 14/613,057

(22) Filed: Feb. 3, 2015

(65) Prior Publication Data
US 2015/0146057 A1 May 28, 2015

Related U.S. Application Data

(63) Continuation of application No. PCT/JP2013/072139, filed on Aug. 20, 2013.

(30) Foreign Application Priority Data

Aug. 23, 2012 (JP) .............................. 2012-184420
Jan. 9, 2013 (JP) .............................. 2013-001694

(51) Int. Cl.
*H04N 5/33* (2006.01)
*G02B 5/28* (2006.01)
(Continued)

(52) U.S. Cl.
CPC ................. *H04N 5/332* (2013.01); *C03C 3/16* (2013.01); *C03C 3/17* (2013.01); *C03C 3/19* (2013.01);
(Continued)

(58) Field of Classification Search
None
See application file for complete search history.

(56) References Cited

U.S. PATENT DOCUMENTS 5,543,086 A    8/1996 Bertelson et al.
5,695,907 A *  12/1997 Chang ................ B41M 5/38214
                                                        430/200

(Continued)

FOREIGN PATENT DOCUMENTS

JP    1-228960     9/1989
JP    7-209510 A   8/1995

(Continued)

OTHER PUBLICATIONS

U.S. Appl. No. 14/729,275, filed Jun. 3, 2015, Shiono, et al.

(Continued)

*Primary Examiner* — Mark Monk
(74) *Attorney, Agent, or Firm* — Oblon, McClelland, Maier & Neustadt, L.L.P

(57) ABSTRACT

There are provided a near-infrared cut filter that effectively uses near-infrared absorbing glass and a near-infrared absorbing dye and is excellent in a near-infrared shielding property, and a high-sensitivity solid-state imaging device including the same. A near-infrared cut filter includes: a near-infrared absorbing glass substrate made of CuO-containing fluorophosphate glass or CuO-containing phosphate glass; and a near-infrared absorbing layer containing a near-infrared absorbing dye (A) and a transparent resin (B), on at least one principal surface of the near-infrared absorbing glass substrate, wherein an average value of a transmittance in a 400 nm to 550 nm wavelength range is 80% or more, and an average value of a transmittance in a 650 nm to 720 nm wavelength range is 15% or less.

30 Claims, 4 Drawing Sheets

(51) Int. Cl.
  *C03C 4/08* (2006.01)
  *C08K 5/3437* (2006.01)
  *G02B 1/04* (2006.01)
  *G02B 5/20* (2006.01)
  *G02B 5/22* (2006.01)
  *C03C 3/16* (2006.01)
  *H04N 5/335* (2011.01)
  *H04N 5/357* (2011.01)
  *C03C 3/17* (2006.01)
  *C03C 3/19* (2006.01)
  *C03C 3/247* (2006.01)
  *C03C 17/42* (2006.01)

(52) U.S. Cl.
  CPC ............... *C03C 3/247* (2013.01); *C03C 4/082* (2013.01); *C03C 17/42* (2013.01); *C08K 5/3437* (2013.01); *G02B 1/04* (2013.01); *G02B 5/208* (2013.01); *G02B 5/223* (2013.01); *G02B 5/226* (2013.01); *G02B 5/281* (2013.01); *H04N 5/335* (2013.01); *H04N 5/357* (2013.01); *C03C 2204/00* (2013.01); *C03C 2217/70* (2013.01); *C03C 2217/73* (2013.01); *C03C 2218/365* (2013.01)

(56) References Cited

U.S. PATENT DOCUMENTS

| | | | | |
|---|---|---|---|---|
| 6,225,244 | B1 * | 5/2001 | Oguma | C03C 3/16 501/45 |
| 6,902,791 | B2 * | 6/2005 | Kawasato | G02B 5/208 156/324 |
| 7,192,897 | B2 | 3/2007 | Yamane et al. | |
| 2010/0179348 | A1 * | 7/2010 | Lee | C07F 9/28 564/277 |
| 2012/0243077 | A1 | 9/2012 | Osawa et al. | |
| 2013/0069024 | A1 | 3/2013 | Suzuki | |

FOREIGN PATENT DOCUMENTS

| | | |
|---|---|---|
| JP | 2004-083290 | 3/2004 |
| JP | 2007-47531 A | 2/2007 |
| JP | 2008-051985 | 3/2008 |
| JP | 2008-70825 A | 3/2008 |
| JP | 2008-070827 | 3/2008 |
| JP | 2008-105958 A | 5/2008 |
| JP | 2008-181028 | 8/2008 |
| JP | 2008-298820 | 12/2008 |
| JP | 2008-303130 | 12/2008 |
| JP | 2008-303130 A | 12/2008 |
| JP | 2012-008532 | 1/2012 |
| WO | WO 2011/118724 A1 | 9/2011 |

OTHER PUBLICATIONS

International Search Report issued in PCT/JP2013/072139, dated Nov. 12, 2013.

H. Zhang et al.; "Amino Acid Promoted CuI-Catalyzed C—N Bond Formation between Aryl Halides and Amines or N-Containing Heterocycles"; JOC Article; J.Org. Chem.; 70 (13); pp. 5164-5173; 2005.

International Preliminary Report of Patentability and Written Opinion issued Mar. 5, 2015 in PCT/JP2013/072139 (English translation only).

The Submissions to the Japanese Patent Office by the third party issued May 22, 2015 in Japanese Patent Application No. 2014-531628 (without English Translation).

* cited by examiner

NEAR-INFRARED CUT FILTER AND SOLID-STATE IMAGING DEVICE

CROSS-REFERENCE TO RELATED APPLICATIONS

This application is a continuation of prior International Application No. PCT/JP2013/072139 filed on Aug. 20, 2013, which is based upon and claims the benefit of priority from Japanese Patent Applications No. 2012-184420 filed on Aug. 23, 2012, and No. 2013-001694 filed on Jan. 9, 2013; the entire contents of all of which are incorporated herein by reference.

TECHNICAL FIELD

The present invention relates to a near-infrared cut filter having a near-infrared shielding effect and a solid-state imaging device including the same.

BACKGROUND

In recent years, optical filters that sufficiently transmit light in a visible wavelength range but shields light in a near-infrared wavelength range have been used for various applications.

For example, in an imaging device such as a digital still camera and a digital video camera, a solid-state image sensor (CCD, CMOS, the like) is used. In order to make sensitivity of the solid-state image sensor close to visibility of a human being, an optical filter is disposed between an imaging lens and the solid-state image sensor.

Among these, as an optical filter for an imaging device, near-infrared absorbing glass in which CuO or the like is added to fluorophosphate-based glass or phosphate-based glass so that light in the near-infrared wavelength range is selectively absorbed, and a glass filter using the same have been known (see Patent Reference JP-B 4169545). However, in the light-absorbing glass filter, performance to shield light with wavelengths in the near-infrared range and a transmitting property for a wavelength band (630 nm to 700 nm) which is required for photographing a dark part more brightly are not sufficient. In addition, due to layer formation restriction to prevent a function of the solid-state image sensor from being obstructed, an optical filter having a sufficient near-infrared cut filter function has not been obtained in the present circumstances.

Therefore, in order to solve the above problems, there have been developed a reflection-type interference filter in which, for example, a silicon oxide ($SiO_2$) layer and a titanium oxide ($TiO_2$) layer are stacked alternately on a substrate and which reflects and shields light in the near-infrared wavelength range by the interference of light, a film in which a dye that absorbs light in the near-infrared wavelength range is contained in a transparent resin, and the like (see Patent Reference JP-A 2008-181028). There has also been developed an optical filter being the combination of these, in which a resin layer containing a dye that absorbs near-infrared light and a layer that reflects near-infrared light are stacked (see Patent Reference JP-A 2008-051985). Further, a resin layer containing a dye that absorbs near-infrared light is known to public, for instance (see Patent Reference JP-A 2012-008532).

SUMMARY

When a near-infrared absorbing dye which exhibits the maximum absorption wavelength near 700 nm to 750 nm and whose absorption curve for light with 630 nm to 700 nm wavelengths has a steep slope is used in combination with other shielding component or shielding member, a good near-infrared shielding property is obtained. This near-infrared absorbing dye is dispersed in a transparent resin, for example, in a cycloolefin resin to produce a resin layer, which is used in a near-infrared cut filter.

However, a near-infrared absorption wavelength range of such a near-infrared absorbing dye is narrow, and even if it is combined with the other shielding member, a wavelength range not sufficiently absorbed often appears, which has been problematic. Therefore, there has been a demand for an optical filter whose near-infrared absorption wavelength range is wide and whose absorption curve for the light with the 630 nm to 700 nm wavelengths has a steep slope.

It is an object of the present invention to provide a near-infrared cut filter effectively using near-infrared absorbing glass and a near-infrared absorbing dye and excellent in a near-infrared shielding property, and a high-sensitivity solid-state imaging device using the same.

The present invention provides a near-infrared cut filter and a solid-state image device having the following structures.

[1] A near-infrared cut filter including:
a near-infrared absorbing glass substrate made of CuO-containing fluorophosphate glass or CuO-containing phosphate glass; and
a near-infrared absorbing layer containing a near-infrared absorbing dye (A) and a transparent resin (B), on at least one principal surface of the near-infrared absorbing glass substrate,
wherein in the near-infrared cut filter, an average value of a transmittance in a 400 nm to 550 nm wavelength range is 80% or more, and an average value of a transmittance in a 650 nm to 720 nm wavelength range is 15% or less.

[2] The near-infrared cut filter according to [1], wherein a refractive index of the transparent resin (B) is 1.45 or more.

[3] The near-infrared cut filter according to [1], wherein the near-infrared absorbing dye (A) causes an absorption spectrum of a 400 nm to 850 nm wavelength range of a resin film fabricated by the near-infrared absorbing dye (A) being dispersed in the transparent resin (B) to have a maximum absorption wavelength in a 650 nm to 750 nm wavelength range.

[4] The near-infrared cut filter according to [3], wherein the near-infrared absorbing dye (A) is at least one selected from a group consisting of a cyanine-based compound, a phthalocyanine-based compound, and a squarylium-based compound.

[5] The near-infrared cut filter according to [4], wherein the squarylium-based compound is at least one selected from squarylium-based compounds expressed by the following formula (F1).

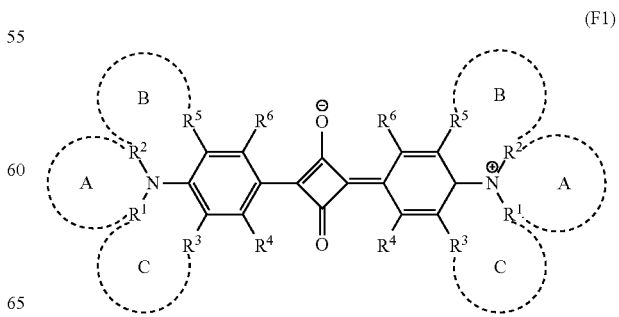

(F1)

Symbols in the formula (F1) are as follows.

$R^4$s and $R^6$s each independently represent a hydrogen atom, a halogen atom, a hydroxyl group, an alkyl group or an alkoxy group each having 1 to 6 carbon atoms, an acyloxy group having 1 to 10 carbon atoms, or —$NR^7R^8$ (where $R^7$ and $R^8$ are each independently a hydrogen atom, an alkyl group having 1 to 20 carbon atoms, or —C(=O)—$R^9$ (where $R^9$ is a hydrogen atom, an alkyl group having 1 to 20 carbon atoms or an aryl group having 6 to 11 carbon atoms which may each have a substituent, or an alaryl group having 7 to 18 carbon atoms which may have a substituent and may have an oxygen atom between carbon atoms)).

At least one pair of $R^1$ and $R^2$, $R^2$ and $R^5$, and $R^1$ and $R^3$ form a heterocycle A, a heterocycle B, and a heterocycle C, respectively, having 5 or 6 members including a nitrogen atom by coupling with each other, and when not forming the heterocycle, $R^1$ and $R^2$ each independently represent a hydrogen atom, an alkyl group or an allyl group each having 1 to 6 carbon atoms which may have a substituent, or an aryl group or an alaryl group each having 6 to 11 carbon atoms, and when not forming the heterocycle, $R^3$ and $R^5$ each independently represent a hydrogen atom, a halogen atom, or an alkyl group or an alkoxy group each having 1 to 6 carbon atoms.

[6] The near-infrared cut filter according to [4], wherein the squarylium-based compound is at least one selected from squarylium-based compounds expressed by the following formula (F11).

(F11)

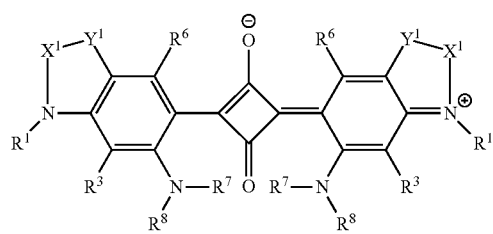

Symbols in the formula (F11) are as follows.

$R^1$s each independently represent a hydrogen atom, an alkyl group or an allyl group each having 1 to 6 carbon atoms which may have a substituent, or an aryl group or an alaryl group each having 6 to 11 carbon atoms, $R^3$s each independently represent a hydrogen atom, a halogen atom, or an alkyl group or an alkoxy group each having 1 to 6 carbon atoms, $R^6$s each independently represent a hydrogen atom, a halogen atom, a hydroxyl group, an alkyl group or an alkoxy group each having 1 to 6 carbon atoms, or an acyloxy group having 1 to 10 carbon atoms, $R^7$s and $R^8$s each independently represent a hydrogen atom, an alkyl group having 1 to 20 carbon atoms, or —C(=O)—$R^9$ (where $R^9$ is a hydrogen atom, an alkyl group having 1 to 20 carbon atoms or an aryl group having 6 to 11 carbon atoms which each may have a substituent, or an alaryl group having 7 to 18 carbon atoms which may have a substituent and may have an oxygen atom between carbon atoms), $X^1$s are each independently a group expressed by the following formula (1x) or (2x), and $Y^1$s are each independently single bond or one of groups expressed by the following formulas (1y) to (5y).

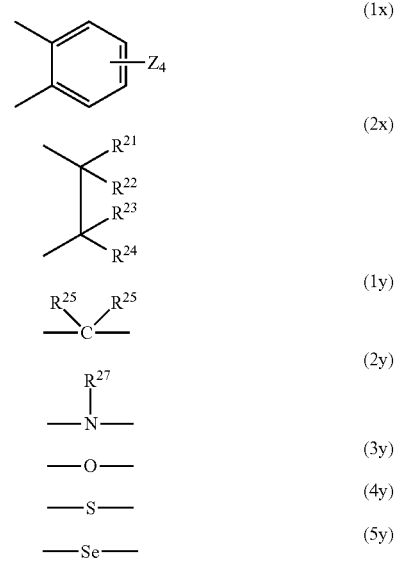

In the formula (1x), four Zs each independently represent a hydrogen atom, a hydroxyl group, an alkyl group or an alkoxy group each having 1 to 6 carbon atoms, or —$NR^{28}R^{29}$ (where $R^{28}$ and $R^{29}$ each independently represent a hydrogen atom or an alkyl group having 1 to 20 carbon atoms), $R^{21}$ to $R^{26}$ each independently represent a hydrogen atom, an alkyl group having 1 to 6 carbon atoms, or an aryl group having 6 to 10 carbon atoms, and $R^{27}$ represents an alkyl group having 1 to 6 carbon atoms or an aryl group having 6 to 10 carbon atoms.

[7] The near-infrared cut filter according to [1], wherein a ratio of the near-infrared absorbing dye (A) to 100 parts by mass of the transparent resin (B) is 0.1 to 20 parts by mass.

[8] The near-infrared cut filter according to [1], further including a dielectric multilayered film in which a dielectric film having refractive index of 1.45 or more and less than 1.55 and a dielectric film having refractive index of not less than 2.2 nor more than 2.5 are alternately stacked, on at least one of a surface of the near-infrared absorbing layer and a surface of the near-infrared absorbing glass substrate.

[9] The near-infrared cut filter according to [8], wherein at least one of the dielectric multilayered films has the following properties.

(ii-1) a transmittance in a 420 nm to 650 nm wavelength range is 90% or more, (ii-2) a transmittance in a 750 nm to 1100 nm wavelength range is 10% or less, and (ii-3) a wavelength on a shortest wavelength side for which a transmittance in a wavelength range longer than 600 nm is 50% exists in a wavelength range of over 650 nm and 730 nm or less.

[10] A solid-state imaging device including the near-infrared cut filter according to [1] and a solid-state image sensor which are disposed in order from a object side or a side where light of a light source is incident.

According to the present invention, it is possible to provide a near-infrared cut filter having an excellent near-infrared shielding function, and a high-sensitivity solid-state imaging device using the same.

DETAILED DESCRIPTION

Figure 1:
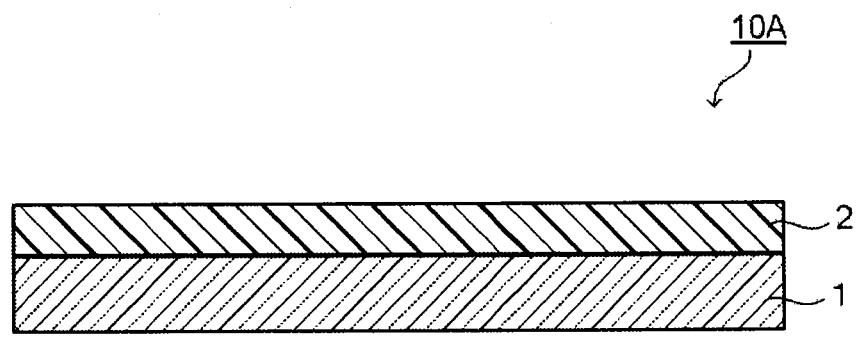
FIG. 1 is a cross-sectional view schematically illustrating an example of a near-infrared cut filter according to an embodiment of the present invention.

Hereinafter, an embodiment of the present invention will be described. Note that the present invention should not be construed as being limited by the following description. A near-infrared cut filter of the present invention (hereinafter, also referred to as a NIR filter) is a NIR filter which includes: a near-infrared absorbing glass substrate made of CuO-containing fluorophosphate glass or CuO-containing phosphate glass; and a near-infrared absorbing layer disposed on at least one principal surface of the near-infrared absorbing glass substrate and containing a near-infrared absorbing dye (A) and transparent resin (B), and which has the following optical properties.
(i-1) an average value of a transmittance in a 400 nm to 550 nm wavelength range is 80% or more
(i-2) an average value of a transmittance in a 650 nm to 720 nm wavelength range is 15% or less Note that, as for the optical properties in the NIR filter, the average value of the transmittance in the 400 nm to 550 nm wavelength range is preferably 82% or more, and more preferably 85% or more. Further, the average value of the transmittance in the 650 nm to 720 nm wavelength range is preferably 13% or less, and more preferably 10% or less. Further, when the NIR filter of the present invention is composed only of the aforesaid near-infrared absorbing glass substrate and the aforesaid near-infrared absorbing layer, especially the average value of the transmittance in the 400 nm to 550 nm wavelength range of the NIR filter is preferably 83% or more, and more preferably 85% or more. When the NIR filter of the present invention includes the aforesaid near infrared absorbing glass substrate, the aforesaid near-infrared absorbing layer, and another constituent element, the average value of the transmittance in the 400 nm to 550 nm wavelength range in a stack in which the aforesaid near-infrared absorbing layer is stacked on the aforesaid near-infrared absorbing glass substrate is preferably 83% or more, and more preferably 85% or more.

Preferably, on at least one of a surface of the near-infrared absorbing layer and a surface of the near-infrared absorbing glass substrate, the NIR filter of the present invention further has a dielectric multilayered film in which a dielectric film having refractive index of 1.45 or more and less than 1.55 and a dielectric film having refractive index of not less than 2.2 nor more than 2.5 are alternately stacked.

Here, in this description, the surface of the near-infrared absorbing layer refers to a principal surface not in contact with other layer, substrate, or the like out of principal surfaces of the near-infrared absorbing layer, that is, its principal surface in contact with the atmosphere. The surface of the near-infrared absorbing glass substrate also means the same.

The NIR filter of the present invention is a NIR filter effectively using the near-infrared absorbing glass and the near-infrared absorbing dye and excellent in a near-infrared shielding property. Further, even when it has the dielectric multilayered film, it is possible to make a full use of a light absorbing property of the dielectric multilayered film without being influenced by angle dependence that the dielectric multilayered film inherently has, which dependence means that an absorption wavelength shifts depending on an angle of incidence of light, and as a result, it can be a NIR filter especially excellent in a near-infrared shielding property.

Hereinafter, an embodiment of the NIR filter of the present invention will be described by using the drawings. FIG. 1 is a cross-sectional view schematically illustrating an example of the NIR filter according to the embodiment of the present invention.

As illustrated in FIG. 1, the NIR filter 10A of this embodiment includes a near-infrared absorbing glass substrate 1 and a near-infrared absorbing layer 2 stacked on one principal surface of the near-infrared absorbing glass substrate 1.

[Near-Infrared Absorbing Glass Substrate]

The near-infrared absorbing glass substrate 1 (hereinafter, the near-infrared absorbing glass substrate will also be referred to simply as a "glass substrate") is made of CuO-containing fluorophosphate glass or CuO-containing phosphate glass (hereinafter, they are also collectively referred to as "CuO-containing glass".). By being made of the CuO-containing glass, the glass substrate 1 has a high transmittance for visible light and also has a high shielding property for near-infrared light. Note that the "phosphate glass" also includes silicophosphate glass in which part of a skeleton of the glass is made of $SiO_2$. Examples of the CuO-containing glass used in the glass substrate 1 are those having the following compositions.

(1) Glass containing 0.5 to 7 parts by mass of CuO in terms of outer percentage, to 100 parts by mass of base glass containing, in mass %, 46% to 70% of $P_2O_5$, 0.2% to 20% of $AlF_3$, 0% to 25% of LiF+NaF+KF, 1% to 50% of $MgF_2$+$CaF_2$+$SrF_2$+$BaF_2$+$PbF_2$, where F is 0.5% to 32% and O is 26% to 54%.

(2) Glass made of, in mass %, 25% to 60% of $P_2O_5$, 1% to 13% of $Al_2OF_3$, 1% to 10% of MgO, 1% to 16% of CaO, 1% to 26% of BaO, 0% to 16% of SrO, 0% to 16% of ZnO, 0% to 13% of $Li_2O$, 0% to 10% of $Na_2O$, 0% to 11% of $K_2O$, 1% to 7% of CuO, 15% to 40% of ΣRO (R is Mg, Ca, Sr, Ba), 3% to 18% of ΣR'$_2$O (R' is Li, Na, K) (up to 39% molar quantity of $O^{2-}$ ion is substituted by $F^-$ ion).

(3) Glass containing, in mass %, 5% to 45% of $P_2O_5$, 1% to 35% of $AlF_3$, 0% to 40% of RF (R is Li, Na, K), 10% to 75% of R'$F_2$ (R' is Mg, Ca, Sr, Ba, Pb, Zn), 0% to 15% of R"$F_m$ (R" is La, Y, Cd, Si, B, Zr, Ta, and "m" is the number corresponding to valence of R") (up to 70% of the total amount of a fluoride can be substituted by an oxide), and 0.2% to 15% of CuO.

(4) Glass containing, in cation %, 11% to 43% of $P^{5+}$, 1% to 29% of $Al^{3+}$, 14% to 50% of R cation (total amount of Mg, Ca, Sr, Ba, Pb, and Zn ions), 0% to 43% of R' cation (total amount of Li, Na, and K ions), 0% to 8% of R" cation (total amount of La, Y, Gd, Si, B, Zr, and Ta ions), and 0.5% to 13% of $Cu^{2+}$, and further containing 17% to 80% of $F^-$ in anion %.

(5) Glass containing, in cation %, 23% to 41% of $P^{5+}$, 4% to 16% of $Al^{3+}$, 11% to 40% of $Li^+$, 3% to 13% of $Na^+$, 12% to 53% of $R^{2+}$ (total amount of $Mg^{2+}$, $Ca^{2+}$, $Sr^{2+}$, $Ba^{2+}$, and $Zn^{2+}$), and 2.6% to 4.7% of $Cu^{2+}$, and further containing, in anion %, 25% to 48% of $F^-$ and 52% to 75% of $O^{2-}$.

(6) Glass containing 0.1 to 5 parts by mass of CuO in terms of outer percentage to 100 parts by mass of base glass made of, in mass %, 70% to 85% of $P_2O_5$, 8% to 17% of $Al_2O_3$, 1% to 10% of $B_2O_3$, 0% to 3% of $Li_2O$, 0% to 5% of $Na_2O$, 0% to 5% of $K_2O$, where $Li_2O+Na_2O+K_2O$ is 0.1% to 5%, and 0% to 3% of $SiO_2$.

To cite examples of commercially available products, examples of the glass (1) are NF50-E, NF50-EX (they are manufactured by Asahi Glass Co., Ltd, brand name), and so on, examples of the glass (2) are BG-60, BG-61 (they are manufactured by Schott AG, brand name), and so on, and examples of the glass (5) are CD5000 (manufactured by HOYA Corporation, brand name) and so on.

Further, the aforesaid CuO-containing glass may further contain a metal oxide. For example, when containing one kind or two kinds or more of $Fe_2O_3$, $MoO_3$, $WO_3$, $CeO_2$, $Sb_2O_3$, $V_2O_5$, and so on as the metal oxide, the CuO-containing glass has an ultraviolet absorbing property. As for the content of the metal oxide to 100 parts by mass of the aforesaid CuO-containing glass, it is preferable that, in the case of at least one selected from a group consisting of $Fe_2O_3$, $MoO_3$, $WO_3$, and $CeO_2$, $Fe_2O_3$ is 0.6 to 5 parts by mass, $MoO_3$ is 0.5 to 5 parts by mass, $WO_3$ is 1 to 6 parts by mass, and $CeO_2$ is 2.5 to 6 parts by mass, or in the case of two of $Fe_2O_3$ and $Sb_2O_3$, $Fe_2O_3$ is 0.6 to 5 parts by mass+$Sb_2O_3$ is 0.1 to 5 parts by mass, or in the case of two of $V_2O_5$ and $CeO_2$, $V_2O_5$ is 0.01 to 0.5 parts by mass+$CeO_2$ is 1 to 6 parts by mass.

As for the near-infrared absorbing performance of the glass substrate 1, it suffices if the NIR filter 10A obtained by stacking the glass substrate 1 and the later-described near-infrared absorbing layer 2 has the aforesaid optical properties of (i-1) and (i-2). A thickness of the glass substrate 1 is preferably within a range of 0.03 mm to 5 mm in view of downsizing and thinning of a device and suppression of breakage at the time of handling, and more preferably within a range of 0.05 mm to 1 mm in view of weight reduction and strength.

Further, as for the optical property of the glass substrate 1, the glass substrate 1 preferably has an 80% transmittance or more in a 400 nm to 550 nm wavelength range, and has a 40% transmittance or less in a 750 nm to 1000 nm wavelength range, when having the preferable thickness of 0.03 mm to 5 mm.

The transmittance in the present invention is a value measured by using an ultraviolet-visible spectrophotometer. In this description, that the transmittance is 70% or more in a specific wavelength range means that the transmittance is 70% or more for all the wavelengths in this wavelength range, and that the transmittance is 10% or less means that the transmittance is 10% or less for all the wavelengths in this wavelength range, and the same also applies to other transmittances. Note that the transmittance of light refers to a ratio of light traveling straight in a sample to be transmitted to the opposite side, in the light incident from a direction perpendicular to a principal surface of the sample, unless otherwise mentioned. Further, in the measurement of the transmittance of light, when the transmittance is measured for light which is made incident from a direction other than the direction perpendicular to the principal surface of the sample, an angle made by a straight line indicating the incidence direction of the light and a line perpendicular to the principal surface is called an angle of incidence.

As a use manner of the NIR filter 10A, it is sometimes used, with the glass substrate 1 side being directly pasted on, for example, a solid-state image sensor of an imaging device. In this case, a difference between a coefficient of linear expansion of the glass substrate 1 and a coefficient of linear expansion of a part where the NIR filter 10A is pasted is preferably adjusted to $30 \times 10^{-7}$/K or less. When the difference between the coefficients of linear expansion is small, it is possible to suppress peeling or the like of the NIR filter after it is pasted.

When used as, for example, a cover airtightly sealed in order to protect a solid-state image sensor in a solid-state imaging device, the NIR filter 10A can contribute to the downsizing and thinning of the solid-state imaging device. Here, when the cover contains an α ray emitting element (radioactive isotope) as impurities, an α ray is emitted, which may cause a transitory malfunction (soft error) of the solid-state image sensor. Therefore, in such an application, the content of the α ray emitting element in the CuO-containing glass forming the glass substrate 1 is preferably as small as possible. Among the α ray emitting elements, the content of U and Th is preferably 20 ppb or less, and more preferably 5 ppb or less.

Before the near-infrared absorbing layer 2 described below is stacked on the principal surface of the glass substrate 1, the surface, of the glass substrate 1, on which this layer is stacked may be surface-treated by a silane coupling agent. Using the glass substrate 1 surface-treated by the silane coupling agent can enhance its adhesion to the near-infrared absorbing layer 2. As the silane coupling agent, the same agents as those used in the following near-infrared absorbing layer 2 are usable, for instance.

[Near-Infrared Absorbing Layer]

The near-infrared absorbing layer 2 is a layer containing a near-infrared absorbing dye (A) and a transparent resin (B), and is typically a layer in which the near-infrared absorbing dye (A) is uniformly dispersed in the transparent resin (B).

(Near-Infrared Absorbing Dye (A))

The near-infrared absorbing dye (A) (hereinafter, referred to as a "dye (A)") is not particularly limited, provided that it is a near-infrared absorbing dye that transmits light in a visible wavelength range (450 nm to 600 nm) and has a capability to absorb light in a near-infrared wavelength range (700 nm to 1100 nm). Note that the dye in the present invention may be a pigment, that is, may be in a state where molecules are aggregated. Hereinafter, the near-infrared absorbing dye will be referred to as a "NIR absorbing dye" as required.

The dye (A) is preferably one that exhibits a maximum absorption wavelength in a 650 nm to 750 nm wavelength range, in an absorption spectrum of a 400 nm to 850 nm wavelength range which is measured by using a resin film obtained by the dye (A) being dispersed in the transparent resin (B). A near-infrared absorbing dye having this absorption property will be referred to as a dye (A1). The maximum absorption wavelength in this absorption spectrum will be referred to as λmax of the dye (A1). Note that the absorption spectrum of the dye (A1) has an absorption peak having an apex of the absorption at the wavelength λmax (hereinafter, referred to as an "absorption peak with λmax"). Preferably, in the absorption spectrum of the dye (A1), λmax exists in the 650 nm to 750 nm wavelength range, and in addition, absorption of a visible light range is small and a slope on the visible light side of the absorption peak with λmax is steep. Further, a slope on a long wavelength side of the absorption peak with λmax is preferably gentle.

Examples of the dye (A1) are a cyanine-based compound, a phthalocyanine-based compound, a naphthalocyanine-based compound, a dithiol metal complex-based compound, a diimonium-based compound, a polymethine-based compound, a phthalide compound, a naphthoquinone-based compound, an anthraquinone-based compound, an indophenol-based compound, a squarylium-based compound, and so on.

Among these, the squarylium-based compound, the cyanine-based compound, and the phthalocyanine-based compound are more preferable, and the squarylium-based compound is especially preferable. The dye (A1) made of the squarylium-based compound is preferable because, in its absorption spectrum described above, the absorption of the visible light range is small and the slope of the absorption peak with λmax is steep on the visible light side, and this dye (A1) is high in storage stability and stability for light. The dye (A1) made of the cyanine-based compound is preferable because, in its absorption spectrum described above, the absorption of the visible light range is small and it has a high absorptance of light on a long wavelength side in a wavelength range near λmax. Further, the cyanine-based compound is a dye used from a long time ago as a recording dye of CD-R or the like and costs low, and has been known as being capable of ensuring long-term stability by being salified. The dye (A1) made of the phthalocyanine-based compound is preferable because of its excellent heat resistance and weather resistance.

The dye (A1) being the squarylium-based compound is concretely at least one selected from squarylium-based compounds expressed by the following formula (F1). In this description, the compound expressed by the formula (F1) is also called a compound (F1). The same applies to other compounds.

The compound (F1) is a squarylium-based compound having a structure in which benzene rings are bonded at left and right sides of a squarylium skeleton and further nitrogen atoms are bonded at 4-position of the benzene rings and saturated heterocycles containing the nitrogen atoms are formed, and is a compound having the aforesaid light absorbing property as the dye (A1). In the compound (F1), substituents of the benzene rings can be appropriately adjusted within the following range according to other required properties such as enhancing solubility to a solvent which is used when the near-infrared absorbing layer is formed (hereinafter, sometimes referred to also as a "host solvent") and to the transparent resin (B).

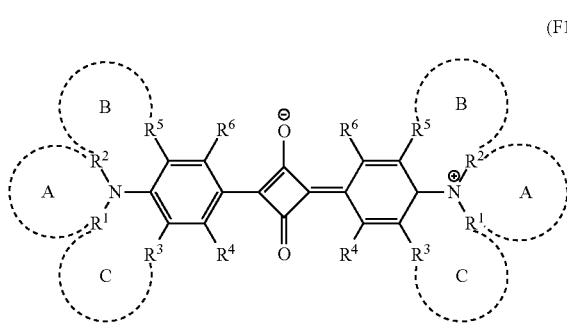

(F1)

Symbols in the formula (F1) are as follows.
$R^4$s and $R^6$s each independently represent a hydrogen atom, a halogen atom, a hydroxyl group, an alkyl group or an alkoxy group each having 1 to 6 carbon atoms, an acyloxy group having 1 to 10 carbon atoms, or —$NR^7R^8$ (where $R^7$ and $R^8$ are each independently a hydrogen atom, an alkyl group having 1 to 20 carbon atoms, or —C(=O)—$R^9$ (where $R^9$ is a hydrogen atom, an alkyl group having 1 to 20 carbon atoms or an aryl group having 6 to 11 carbon atoms which may each have a substituent, or an alaryl group having 7 to 18 carbon atoms which may have a substituent and may have an oxygen atom between carbon atoms)).

At least one pair of $R^1$ and $R^2$, $R^2$ and $R^5$, and $R^1$ and $R^3$ form a heterocycle A, a heterocycle B, and a heterocycle C, respectively, having 5 or 6 members including a nitrogen atom by coupling with each other.

When forming the heterocycle A, $R^1$ and $R^2$ represent, as a bivalent group-Q- in which they are bonded, an alkylene group or an alkyleneoxy group in which a hydrogen atom may be substituted by an alkyl group having 1 to 6 carbon atoms, by an aryl group having 6 to 10 carbon atoms, or by an acyloxy group having 1 to 10 carbon atoms which may have a substituent.

As for $R^2$ and $R^5$ when forming the heterocycle B, and $R^1$ and $R^3$ when forming the heterocycle C, in bivalent groups —$X^1$—$Y^1$— and —$X^2$—$Y^2$— (respective sides bonded to nitrogen are $X^1$ and $X^2$) in which they are bonded, $X^1$ and $X^2$ are each a group expressed by the following formula (1x) or (2x), and $Y^1$ and $Y^2$ are each a group expressed by one selected from the following formulas (1y) to (5y). When $X^1$ and $X^2$ are each the group expressed by the following formula (2x), $Y^1$ and $Y^2$ each may be a single bond.

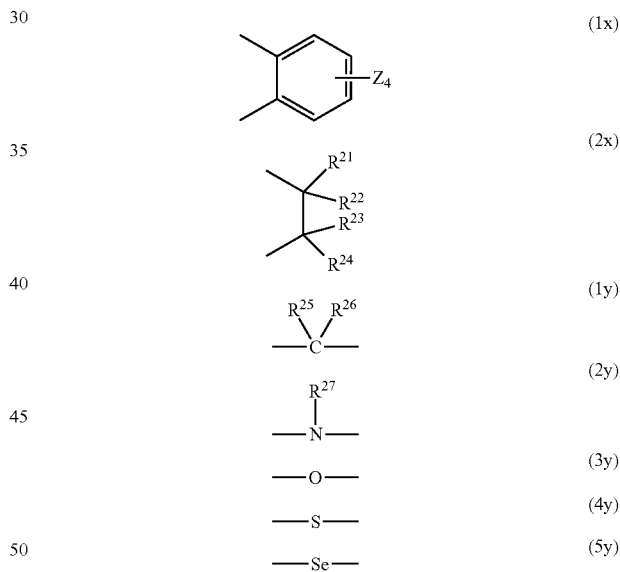

In the formula (1x), four Zs each independently represent a hydrogen atom, a hydroxyl group, an alkyl group or an alkoxy group each having 1 to 6 carbon atoms, or —$NR^{28}R^{29}$ (where $R^{28}$ and $R^{29}$ each independently represent a hydrogen atom or an alkyl group having 1 to 20 carbon atoms), $R^{21}$ to $R^{26}$ each independently represent a hydrogen atom, an alkyl group having 1 to 6 carbon atoms, or an aryl group having 6 to 10 carbon atoms, and $R^{27}$ represents an alkyl group having 1 to 6 carbon atoms or an aryl group having 6 to 10 carbon atoms.

$R^7$, $R^8$, $R^9$, $R^4$, $R^6$, $R^{21}$ to $R^{27}$, and $R^1$ to $R^3$ and $R^5$ when not forming the heterocycle, each may form a five-membered ring or a six-membered ring by bonding with one of the others among these. $R^{21}$ and $R^{26}$, and $R^{21}$ and $R^{27}$ may directly bond with each other.

When not forming the heterocycle, $R^1$ and $R^2$ each independently represent a hydrogen atom, an alkyl group or an allyl group each having 1 to 6 carbon atoms which may have a substituent, or an aryl group or an alaryl group each having 6 to 11 carbon atoms. When not forming the heterocycle, $R^3$ and $R^5$ each independently represent a hydrogen atom, a halogen atom, or an alkyl group or an alkoxy group each having 1 to 6 carbon atoms. Hereinafter, the heterocycle A will be sometimes referred to simply as a ring A. The same applies to the heterocycle B and the heterocycle C.

In the compound (F1), $R^4$s and $R^6$s are each independently represent the aforesaid atom or group. Examples of the halogen atom are a fluorine atom, a chlorine atom, a bromine atom, and the like. The alkyl group may be linear chained, branched chained, or cyclic. As for $R^4$ and $R^6$, the combination in which one of these is a hydrogen atom and the other is $-NR^7R^8$ is preferable.

When the compound (F1) has only the ring A, only the ring B and the ring C, or the ring A to the ring C, among the ring A to the ring C, $-NR^7R^8$ may be introduced into either of $R^4$ and $R^6$. When the compound (F1) has only the ring B, or only the ring A and the ring B, $-NR^7R^8$ is preferably introduced into $R^4$. Similarly, when it has only the ring C, or only the ring A and the ring C, $-NR^7R^8$ is preferably introduced into $R^6$.

As $-NR^7R^8$, $-NH-C(=O)-R^9$ is preferable in view of solubility to the host solvent and the transparent resin (B). As $R^9$, an alkyl group having 1 to 20 carbon atoms which may have a substituent, an aryl group having 6 to 10 carbon atoms which may have a substituent, or an alaryl group having 7 to 18 carbon atoms which may have a substituent and may have an oxygen atom between carbon atoms is preferable. Example of the substituent are a fluorine atom, an alkyl group having 1 to 6 carbon atoms, a fluoroalkyl group having 1 to 6 carbon atoms, an alkoxy group having 1 to 6 carbon atoms, an acyloxy group having 1 to 6 carbon atoms, and the like.

Among these, $R^9$ is preferably a group selected from a linear chained, branched-chained, or cyclic alkyl group having 1 to 17 carbon atoms which may be substituted by a fluorine atom, a phenyl group which may be substituted by a fluoroalkyl group having 1 to 6 carbon atoms and/or an alkoxy group having 1 to 6 carbon atoms, and an alaryl group having 7 to 18 carbon atoms which may have an oxygen atom between carbon atoms and has an alkyl group having 1 to 6 carbon atoms which may be substituted by a fluorine atom and/or a phenyl group which may be substituted by an alkoxy group having 1 to 6 carbon atoms at terminals.

In the compound (F1), it is only necessary that at least any one of the ring A, the ring B, and the ring C which are respectively formed a 5-membered ring or a 6-membered ring by $R^1$ and $R^2$, $R^2$ and $R^5$, and $R^1$ and $R^3$ coupled with each other is formed, and two or three of the ring A, the ring B, and the ring C may be formed.

When not forming the ring, $R^1$ and $R^2$ each independently represent a hydrogen atom, an alkyl group or an allyl group each having 1 to 6 carbon atoms which may have a substituent, or an aryl group or an alaryl group each having 6 to 11 carbon atoms. The alkyl group may be linear chained, branched chained, or cyclic. Examples of the substituent are a hydroxyl group, an alkoxy group having 1 to 3 carbon atoms, and an acyloxy group having 1 to 3 carbon atoms. When not forming the ring, $R^3$ and $R^5$ each independently represent a hydrogen atom, a halogen atom, or an alkyl group or an alkoxy group each having 1 to 6 carbon atoms.

Among these, as $R^1$, $R^2$, $R^3$, and $R^5$, an alkyl group having 1 to 3 carbon atoms is preferable, and a methyl group and a 2-propyl group are especially preferable in view of solubility to the host solvent and the transparent resin (B).

Further, in the compound (F1), the groups $R^1$ to $R^6$ that the benzene rings bonded at the left and the right sides of the squarylium skeleton have may be different between the left and the right, but are preferably the same between the left and the right.

Note that the compound (F1) contains a compound (F1-1) which has a resonance structure of the structure expressed by the above general formula (F1) and which is expressed by a formula (F1-1).

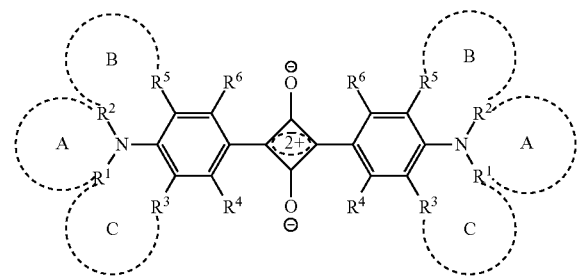

Definitions of symbols in the formula (F1-1) are the same as those in the above formula (F1).

Examples of the compound (F1) are more concretely a compound expressed by the following formula (F11) which has only the ring B as the ring structure, a compound expressed by the following formula (F12) which has only the ring A as the ring structure, and a compound expressed by the following formula (F13) which has two rings, namely, the ring B and the ring C as the ring structure. Note that the compound expressed by the following formula (F11) is the same compound as the compound which has only the ring C as the ring structure and in which $R^6$ is $-NR^7R^8$, in the compound (F1). Further, the compound expressed by the following formula (F11) and the compound expressed by the following formula (F13) are compounds described in the description of U.S. Pat. No. 5,543,086.

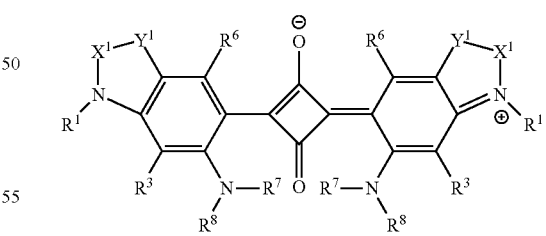
(F11)

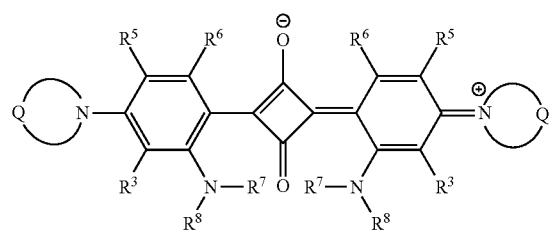
(F12)

(F13)

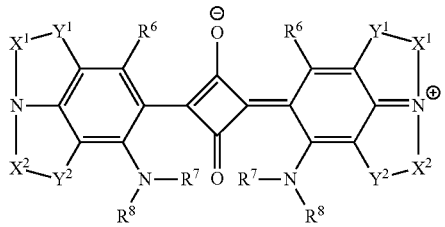

Definitions of symbols in the formulas (F11) to (F13) are the same as those in the above formula (F1), and preferable examples are also the same.

In the compound (F11), as $X^1$, an ethylene group which is expressed by the above formula (2x) and whose hydrogen atom may be substituted by an alkyl group having 1 to 6 carbon atoms or an aryl group having 6 to 10 carbon atoms is preferable. In this case, as the substituent, an alkyl group having 1 to 3 carbon atoms is preferable, and a methyl group is more preferable. Concretely, examples of $X^1$ are —(CH$_2$)$_2$—, —CH$_2$—C(CH$_3$)$_2$—, —CH(CH$_3$)—C(CH$_3$)$_2$—, —C(CH$_3$)$_2$—C(CH$_3$)$_2$—, and so on. As —NR$^7$R$^8$ in the compound (F11), —NH—C(=O)—CH$_3$, —NH—C(=O)—C$_6$H$_{13}$, —NH—C(=O)—C$_6$H$_5$, —NH—C(=O)—CH(C$_2$H$_5$)—C$_4$H$_9$, —NH—C(=O)—C(CH$_3$)$_2$—C$_2$H$_5$, —NH—C(=O)—C(CH$_3$)$_2$—C$_3$H$_7$, —NH—C(=O)—C(CH$_3$)$_2$—(CH$_2$)$_3$—O—C$_6$H$_3$(CH$_3$)$_2$, or the like is preferable.

Examples of the compound (F11) are compounds expressed by the following formula (F11-1), formula (F11-2), formula (F11-3), formula (F11-4), formula (F11-5), and formula (F11-6), and so on. Among these, the compound (F11-2), the compound (F11-3), the compound (F11-4), the compound (F11-5), and the compound (F11-6) are more preferable because of their high solubility to the host solvent and the transparent resin (B).

(F11-1)

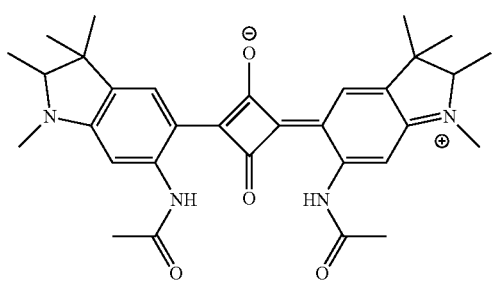

(F11-2)

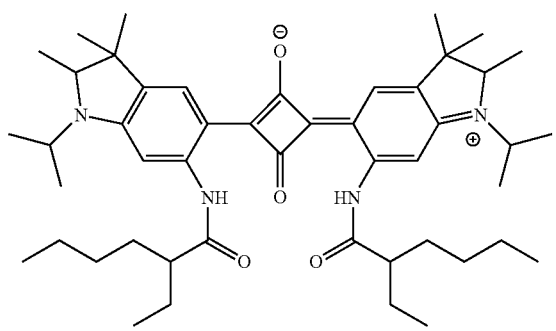

(F11-3)

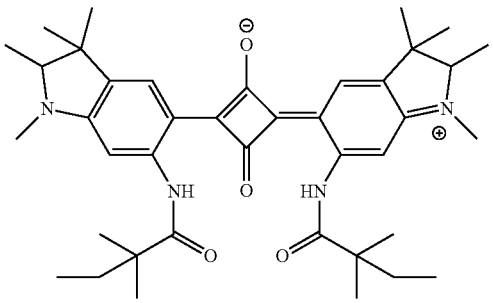

(F11-4)

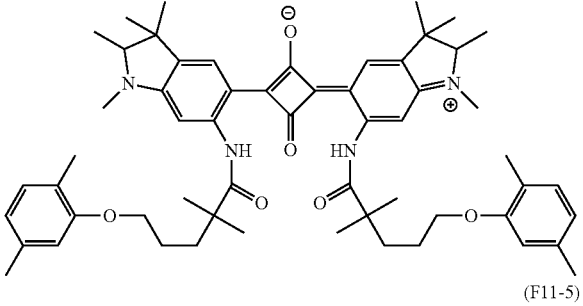

(F11-5)

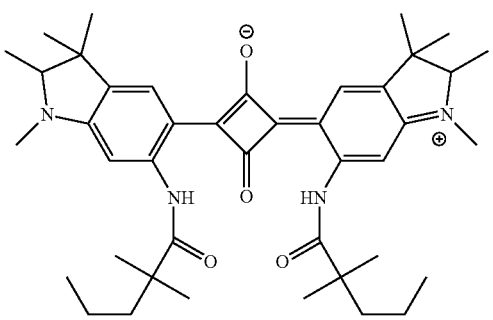

(F11-6)

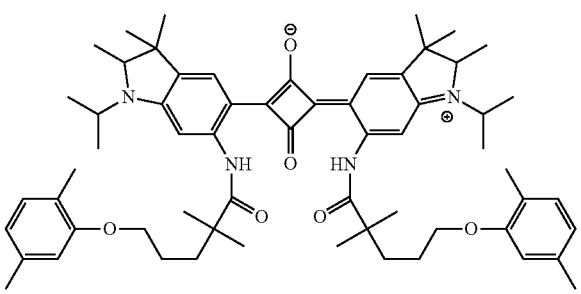

In the compound (F12), Q is an alkylene group having 4 or 5 carbon atoms or an alkyleneoxy group having 3 or 4 carbon atoms in each of which a hydrogen atom may be substituted by an alkyl group having 1 to 6 carbon atoms, by an aryl group having 6 to 10 carbon atoms, or by an acyloxy group having 1 to 10 carbon atoms which may have a substituent. In the case of the alkyleneoxy group, a position of oxygen is preferably not next to N. Note that as Q, a butylene group that may be substituted by an alkyl group having 1 to 3 carbon atoms, especially by a methyl group, is preferable.

In the compound (F12), as —NR$^7$R$^8$, —NH—C(=O)—(CH$_2$)$_m$—CH$_3$ (where "m" is 0 to 19), —NH—C(=O)-Ph-R$^{10}$ (where -Ph- represents a phenylene group, and R$^{10}$ represents a hydrogen atom, an alkyl group having 1 to 3 carbon atoms whose hydrogen atom may be substituted by a fluorine atom, or an alkoxy group having 1 to 3 carbon atoms.), or the like is preferable.

Here, since λ max of the compound (F12) is on a relatively long wavelength side in the aforesaid wavelength range, the use of the compound (F12) makes it possible to widen a transmission range in a visible wavelength band. Examples of the compound (F12) are compounds expressed by the following formula (F12-1), formula (F12-2), and formula (F12-3), and the like.

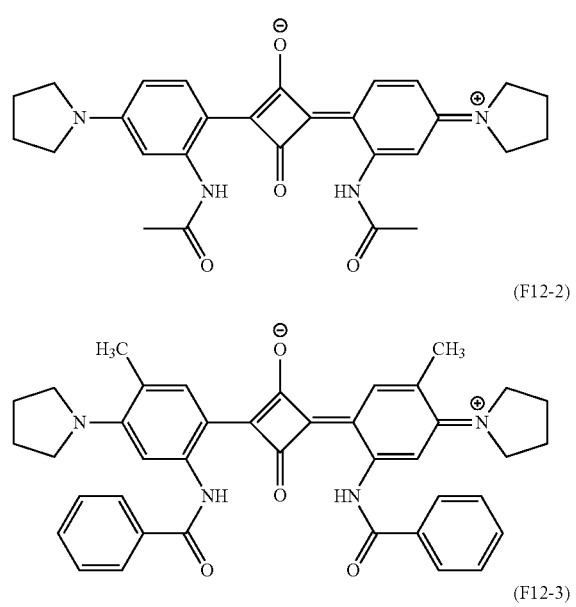

Examples of the compound (F13) are compounds expressed by the following formula (F13-1) and formula (F13-2), and the like.

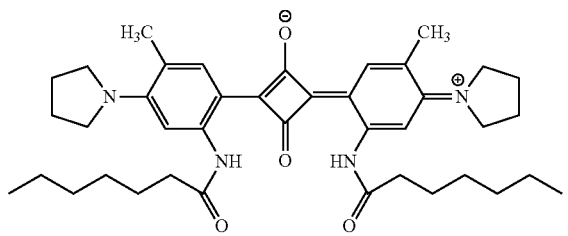

Further, as the dye (A1), a squarylium-based compound expressed by the following formula (F6) is also usable. The formula (F6) represents a compound in which any of the ring A, the ring B, and the ring C is not formed in the formula (F1) (where $R^1$s to $R^6$s are as follows.).

In the compound (F13), preferably, $X^1$ and $X^2$ are each independently an ethylene group which is expressed by the above formula (2x) and whose hydrogen atom may be substituted by an alkyl group having 1 to 6 carbon atoms or an aryl group having 6 to 10 carbon atoms. In this case, as the substituent, an alkyl group having 1 to 3 carbon atoms is preferable, and a methyl group is more preferable. Examples of $X^1$ and $X^2$ are, concretely, —$(CH_2)_2$—, —$CH_2$—$C(CH_3)_2$—, —$CH(CH_3)$—$C(CH_3)_2$—, —$C(CH_3)_2$—$C(CH_3)_2$—, and so on. Examples of $Y^1$ and $Y^2$ are independently —$CH_2$—, —$C(CH_3)_2$—, —$CH(C_6H_5)$—, —$CH((CH_2)_mCH_3)$— (where "m" is 0 to 5), and so on. In the compound (F13), —$NR^7R^8$ is preferably —NH—C(=O)—$C_mH_{2m+1}$ (where "m" is 1 to 20, and $C_mH_{2m+1}$ may be linear chained, branched chained, or cyclic.), —NH—C(=O)-Ph-$R^{10}$ (where -Ph- represents a phenylene group, $R^{10}$ represents a hydrogen atom, an alkyl group having 1 to 3 carbon atoms, an alkoxy group having 1 to 3 carbon atoms, or a perfluoroalkyl group having 1 to 3 carbon atoms.), or the like.

Symbols in the formula (F6) are as follows.
$R^1$s and $R^2$s each independently represent a hydrogen atom, an alkyl group or an allyl group each having 1 to 12 carbon atoms which may have a substituent, or an aryl group or an alaryl group each having 6 to 11 carbon atoms. $R^3$s and $R^5$s each independently represent a hydrogen atom, a halogen atom, or an alkyl group or an alkoxy group each having 1 to 6 carbon atoms. $R^4$s and $R^6$s each independently represent a hydrogen atom, a halogen atom, a hydroxyl group, an alkyl group or an alkoxy group each having 1 to 6 carbon atoms, an acyloxy group having 1 to 10 carbon atoms, or —$NR^7R^8$ (where $R^7$ and $R^8$ are each independently a hydrogen atom, an alkyl group having 1 to 20 carbon atoms, or —C(=O)—$R^9$ (where $R^9$ is a hydrogen atom, an alkyl group having 1 to 20 carbon atoms or an aryl group having 6 to 11 carbon atoms which each may have a substituent, or an alaryl group having 7 to 18 carbon atoms which may have a substituent and may have an oxygen atom between carbon atoms)). Examples of the compound (F6) are compounds expressed by a formula (F6-1) and a formula (F6-2), and the like.

(F6-1)

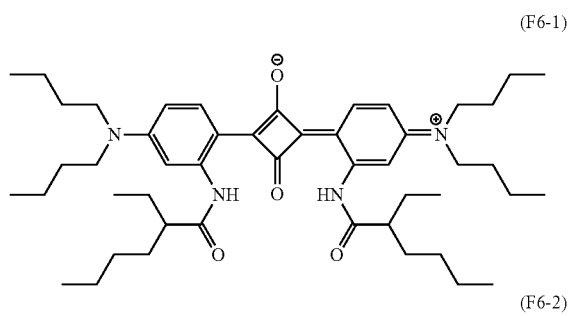

(F6-2)

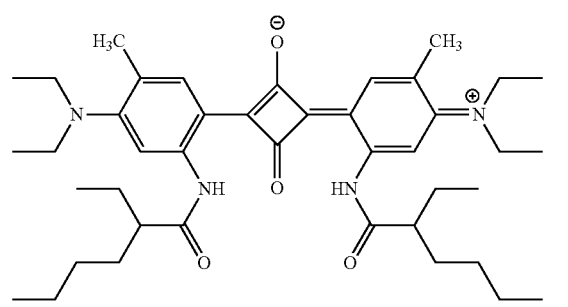

Further, as the dye (A1), a squarylium-based compound expressed by the following formula (F7) is also usable.

(F7)

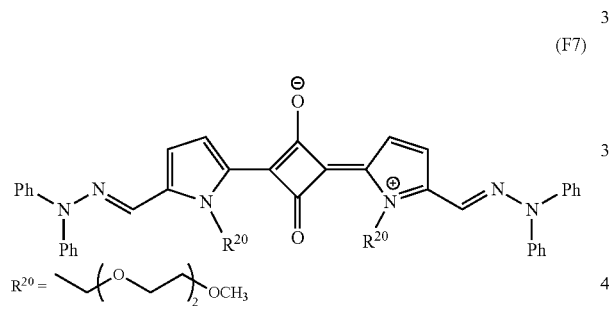

The compound (F1) such as the compound (F11), the compound (F12), and the compound (F13), and the compound (F6) and the compound (F7) which are described above can be manufactured by conventionally well-known methods.

The compound (F11) such as the compound (F11-1) can be manufactured by, for example, a method described in the description of U.S. Pat. No. 5,543,086.

Further, the compound (F12) can be manufactured by, for example, a method described in J. Org. Chem. 2005, 70(13), 5164-5173.

Among these, the compound (F12-1), the compound (F12-2), and the like can be manufactured according to a synthetic pathway indicated by the following reaction formula (F3), for instance.

According to the reaction formula (F3), a carboxylic acid chloride having a desired substituent $R^9$ is made to react with an amino group of 1-methyl-2-iodine-4-aminobenzene, whereby amide is formed. Next, pyrrolidine is made to react, and further, 3,4-dihydroxy-3-cyclobutene-1,2-dione (hereinafter, referred to as squaric acid.) is made to react, whereby the compound (F12-1), the compound (F12-2), or the like is obtained.

(F3)

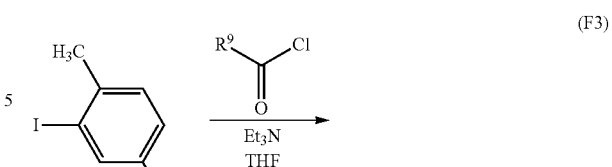

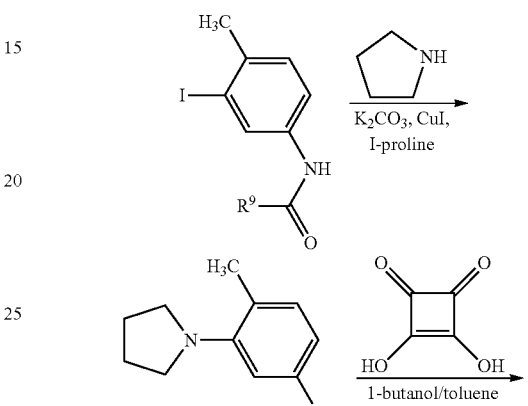

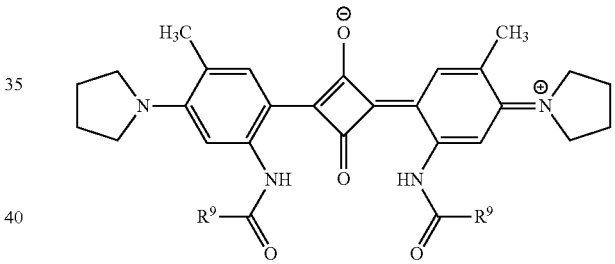

In the reaction formula (F3), $R^9$ represents -Ph or —$(CH_2)_5$—$CH_3$. -Ph represents a phenyl group. Et represents an ethyl group, and THF represents tetrahydrofuran.

Further, the compound F(13-1), the compound (F13-2), and so on can be manufactured according to a synthetic pathway indicated by the following reaction formula (F4), for instance.

In the reaction formula (F4), a trifluoromethanesulfonic acid anhydride ($Tf_2O$) is first made to react with 8-hydroxyjulolidine to produce 8-julolidine trifluoromethanesulfonate, next, benzylamine ($BnNH_2$) is made to react with this to obtain 8-benzylamino julolidine, and this is further reduced, whereby 8-aminojulolidine is manufactured. Next, a carboxylic acid chloride having a desired substituent $R^9$ (—$(CH_2)_6$—$CH_3$ in the case of the compound (F13-1), and —CH(CH($CH_3$))—$CH_2$—C($CH_3$)$_3$)—$(CH_2)_2$—CH($CH_3$)—$CH_2$—C($CH_3$)$_3$ in the case of the compound (F13-2)) is made to react with an amino group of the 8-aminojulolidine, whereby a compound having —NH—C(=O)$R^9$ at 8-position of julolidine is obtained. Next, two moles of this compound are made to react with one mole of squaric acid, whereby the compound (F13-1), the compound (F13-2), and the like are obtained.

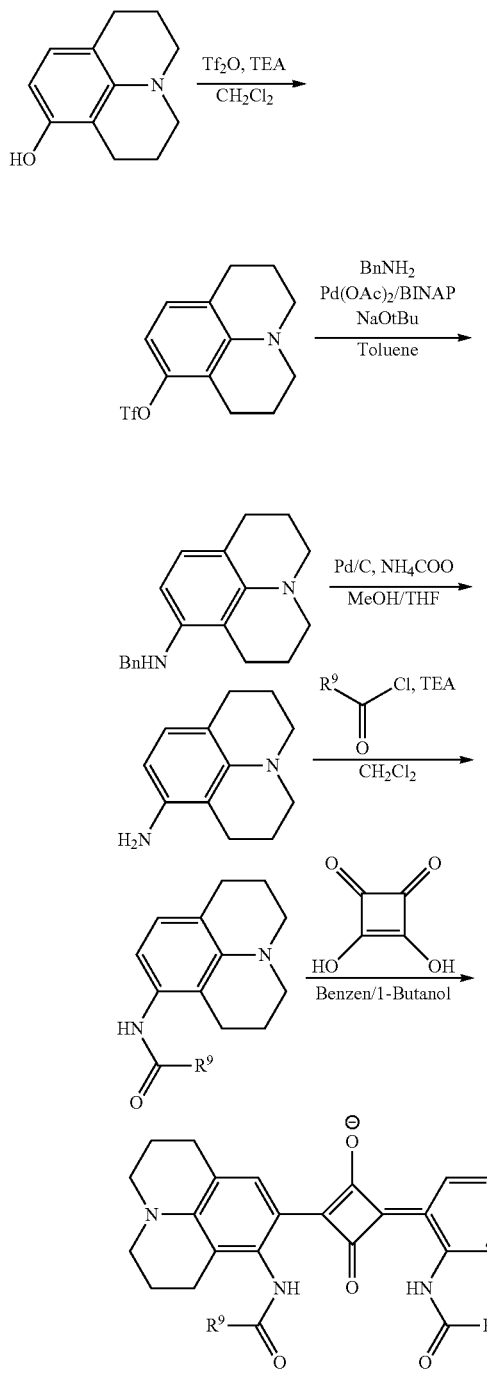

(F4)

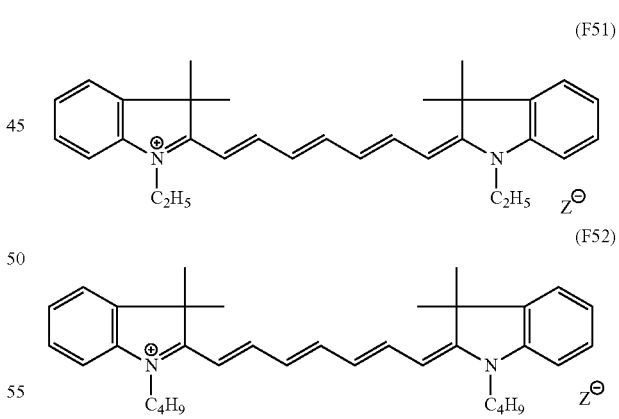

Symbols in the formula (F5) are as follows.

$R^{11}$s each independently represent an alkyl group, an alkoxy group, or an alkyl sulfone group each having 1 to 20 carbon atoms, or an anion species thereof.

$R^{12}$s and $R^{13}$s each independently represent a hydrogen atom or an alkyl group having 1 to 20 carbon atoms.

Z represents $PF_6$, $ClO_4$, $R^f$—$SO_2$, $(R^f$—$SO_2)_2$—N(where $R^f$ represents an alkyl group having 1 to 8 carbon atoms in which at least one hydrogen atom is substituted by a fluorine atom.), or $BF_4$.

$R^{14}$s, $R^{15}$s, $R^{16}$s, and $R^{17}$s each independently represent a hydrogen atom, a halogen atom, or an alkyl group having 1 to 6 carbon atoms.

"n" represents an integer of 1 to 6.

Incidentally, as $R^{11}$ in the compound (F5), an alkyl group having 1 to 20 carbon atoms is preferable, and $R^{12}$s and $R^{13}$s are each independently preferably a hydrogen atom or an alkyl group having 1 to 6 carbon atoms. $R^{14}$s, $R^{15}$S, $R^{16}$s, and $R^{17}$s are each independently preferably a hydrogen atom, and "n" is preferably an integer of 1 to 4. Right and left side structures sandwiching "n" pieces of repetition units may be different, but are preferably the same.

More concrete examples of the compound (F5) are a compound expressed by the following formula (F51), a compound expressed by the following formula (F52), and the like. Anion represented by $Z^-$ is the same as $Z^-$ in the above formula (F5).

In the reaction formula (F4), Me represents a methyl group, TEA represents triethylamine, Ac represents an acetyl group, BINAP represents (2,2'-bis(diphenylphosphino)-1,1'-binaphthyl, and NaOtBu represents sodium t-butoxide.

As the dye (A1) being the squarylium-based compound, a commercially available product may be used. Examples of the commercially available product are S2098, S2084 (brand name, manufactured by FEW Chemicals GmbH), and the like.

A concrete example of the dye (A1) being the cyanine-based compound is at least one selected from cyanine-based compounds expressed by the following formula (F5).

As the dye (A1) being the cyanine-based compound, a commercially available product may be used. Examples of the commercially available product are ADS680HO (brand name, manufactured by American Dye Source, Inc.), S0830 (brand name, manufactured by FEW Chemicals GmbH), S2137 (brand name, manufactured by FEW Chemicals GmbH), and the like.

Further, examples of the phthalocyanine-based compound usable as the dye (A1) are commercially available products such as FB22 (brand name, manufactured by Yamada Chemical Co., Ltd.), TXEX720 (brand name, manufactured by Nippon Shokubai Co., Ltd.), PC142c (brand name, manufactured by Yamada Chemical Co., Ltd.), and the like.

λmax of each of the above-exemplified compounds used as the dye (A1) is presented in Table 1 together with the kind of the transparent resin (B) used at the time of the measurement.

TABLE 1

| kind of dye | abbreviation or brand name of compound | structural formula | brand name of transparent resin (B) | λmax [nm] |
|---|---|---|---|---|
| squarylium-based compound | F11-1 | F11-1 | B-OKP2 | 711 |
| | F11-2 | F11-2 | B-OKP2 | 715 |
| | F11-3 | F11-3 | B-OKP2 | 706 |
| | F11-4 | F11-4 | B-OKP2 | 705 |
| | F11-4 | F11-4 | SP3810 | 704 |
| | F12-1 | F12-1 | B-OKP2 | 686 |
| | F12-2 | F12-2 | B-OKP2 | 715 |
| | F12-3 | F12-3 | B-OKP2 | 711 |
| | F13-1 | F13-1 | B-OKP2 | 715 |
| | F13-2 | F13-2 | B-OKP2 | 715 |
| | F7 | F7 | B-OKP2 | 734 |
| | S2084 | — | EA-F5003 | 679 |
| cyanine-based compound | F51 | F51 | B-OKP2 | 740 |
| | F52 | F52 | B-OKP2 | 747 |
| | ADS680HO | — | EA-F5003 | 694 |
| phthalocyanine-based compound | FB22 | — | VYLON103 | 681 |

Incidentally, among those used as the transparent resin (B) in the above, B-OKP2 and VYLON103 are polyester resins, SP3810 is a polycarbonate resin, and EA-F5003 is an acrylic resin, and their details are as will be described later.

In this embodiment, as the dye (A1), one selected from a plurality of compounds having the above-described light absorbing property as the dye (A1) may be solely used, or two or more of them may be co-used.

The dye (A) preferably contains one of the dyes (A1) or two or more of the dyes (A1). Incidentally, the dye (A) may contain, besides the dye (A1), other NIR absorbing dye as required. When a plurality of the NIR absorbing dyes are used as the dye (A), the NIR absorbing dyes are preferably combined for use so that the maximum absorption wavelength appears in the 650 nm to 750 nm wavelength range, in an absorption spectrum of the 400 nm to 850 nm wavelength range which is measured on a resin film fabricated by dispersing them in the transparent resin (B). Further, it is preferable to combine the NIR absorbing dyes for use so that, in this absorption spectrum, absorption of the visible light range is small, and a slope on a visible light side of an absorption peak with λmax is steep, and its slope on a longer wavelength side becomes gentle.

(Transparent Resin (B))

As the transparent resin (B), a transparent resin whose refractive index is 1.45 or more is preferable. The refractive index is more preferably 1.5 or more, and especially preferably 1.6 or more. An upper limit of the refractive index of the transparent resin (B) is not particularly limited, but is preferably about 1.72 in view of easy availability.

In this description, the refractive index refers to a refractive index for a 589 nm wavelength at 20° C., and the refractive index refers to this refractive index unless otherwise mentioned.

Concrete examples of the transparent resin (B) are an acrylic resin, an epoxy resin, an ene-thiol resin, a polycarbonate resin, a polyether resin, a polyarylate resin, a polysulfone resin, a polyethersulfone resin, a polyparaphenylene resin, a polyarylene ether phosphine oxide resin, a polyimide resin, a polyamide-imide resin, a polyolefin resin, a cyclic olefin resin, and a polyester resin. As the transparent resin (B), one of these resins may be solely used or a mixture of two or more of them may be used. Further, when the transparent resin (B) whose refractive index is 1.45 or more is used, one of these resins may be used solely or a mixture of two or more of them may be used, provided that the refractive index as a whole is 1.45 or more.

Among the above, in view of solubility of the dye (A) to the transparent resin (B), the transparent resin is preferably one or more selected from an acrylic resin, a polyester resin, a polycarbonate resin, an ene-thiol resin, an epoxy resin, and a cyclic olefine resin. Further preferably, the transparent resin is one or more selected from an acrylic resin, a polyester resin, a polycarbonate resin, and a cyclic olefin resin. As the polyester resin, a polyethylene terephthalate resin, a polyethylene naphthalate resin, or the like is preferable.

The refractive index of the transparent resin (B) can be adjusted within the aforesaid range by, for example, adjusting a molecular structure of the raw material component so that a main chain or a side chain of a polymer has a specific structure. Examples of the structure existing in the polymer in order to adjust the refractive index within the aforesaid range are fluorene skeletons expressed by the following formula (B1). Note that, among the fluorene skeletons, a 9,9-bisphenylfluorene skeleton expressed by the following formula (B2) is preferable because a higher refractive index and higher heat resistance can be obtained.

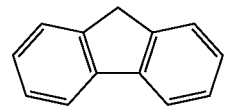

(B1)

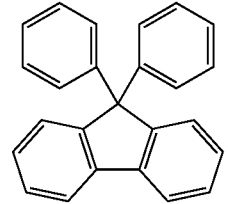

(B2)

As the resin having the aforesaid fluorene skeleton or 9-9-bisphenylfluorene skeleton, an acrylic resin, a polycarbonate resin, and a polyester resin are preferable.

An example of the acrylic resin having the fluorene skeleton is an acrylic resin obtained by polymerizing a raw material component containing a 9,9-bisphenylfluorene derivative in which one substituent having a (metha)acryloyl group at terminal is each introduced into at least two phenyl groups of 9,9-bisphenylfluorene. Note that "(metha) acryloyl . . . " in this description is a generic name of "methacryloyl . . . " and "acryloyl . . . ".

Further, an acrylic resin obtained by polymerizing a compound in which a hydroxyl group is introduced into the aforesaid 9,9-bisphenylfluorene derivative having the (metha)acryloyl group and a urethane (metha)acrylate compound may be used. Examples of the urethane (metha) acrylate compound are a compound obtained as a reaction product of a (metha)acrylate compound having a hydroxyl group and a polyisocyanate compound, and a compound obtained as a reaction product of a (metha)acrylate compound having a hydroxyl group, a polyisocyanate compound, and a polyol compound.

An example of the polyester resin into which the fluorene skeleton is introduced is a polyester resin into which a 9,9-bisphenylfluorene derivative expressed by the following formula (B2-1) as aromatic diol is introduced. In this case, the kind of dicarboxylic acid made to react with the aforesaid aromatic diol is not particularly limited. Such a polyester resin is suitably used as the transparent resin (B) in view of the refractive index and transparency in the visible light range.

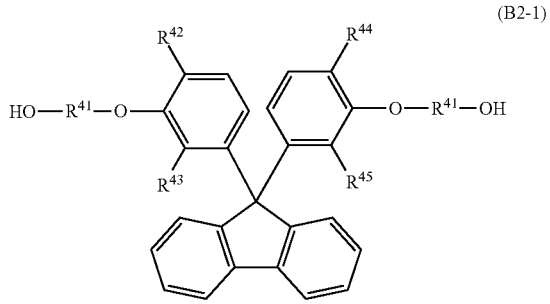

(In the formula (B2-1), $R^{41}$s each represent an alkylene group having 2 to 4 carbon atoms, $R^{42}$, $R^{43}$, $R^{44}$, and $R^{45}$ each independently represent a hydrogen atom, a saturated hydrocarbon group having 1 to 7 carbon atoms, or an aryl group having 6 to 7 carbon atoms.)

As the transparent resin (B), a commercially available product may be used. Examples of a commercially available product of an acrylic resin is a resin obtained by curing OGSOL EA-F5003 (brand name, manufactured by Osaka Gas Chemicals Co., Ltd., refractive index: 1.59). Further, examples of an acrylic resin that can be purchased as being already a polymer are polymethyl methacrylate (refractive index: 1.49) and polyisobutyl methacrylate (refractive index: 1.48) manufactured by Tokyo Chemical Industry Co., Ltd.

Further, examples of a commercially available product of a polyester resin are OKPH4HT (refractive index: 1.64), OKPH4 (refractive index: 1.61), and B-OKP2 (refractive index: 1.63) manufactured by Osaka Gas Chemicals Co., Ltd., and VYLON103 (manufactured by TOYOBO Co., Ltd., refractive index: 1.58). Examples of a commercially available product of a polycarbonate resin are SP3810 (manufactured by Teijin Chemicals Co., Ltd., refractive index: 1.64) and LeXanML9103 (manufactured by sabic Corporation, refractive index 1.59). Examples of a polymer alloy are Panlite AM-8 series (manufactured by Teijin Chemicals Co., Ltd.) which is an alloy of polycarbonate and polyester, and xylex 7507 (manufactured by sabic Corporation).

(Near-Infrared Absorbing Layer)

The near-infrared absorbing layer 2 is a layer containing the dye (A) and the transparent resin (B).

The near-infrared absorbing layer 2 preferably has one of optical properties of the following (a1) and (a2), and more preferably has the both optical properties.

(a1) a transmittance in a 450 nm to 550 nm wavelength range is 80% or more.

(a2) it has the maximum absorption wavelength (λmax) in a 650 nm to 750 nm wavelength range.

It is preferable that the near-infrared absorbing layer 2 satisfies the above conditions (a1) and (a2) because this makes it possible to easily obtain the optical properties of the above (i-1) and (i-2) as the NIR filter 10A obtained by stacking the near-infrared absorbing layer 2 and the glass substrate 1. Consequently, when the NIR filter 10A is used as, for example, a NIR filter of a digital still camera, a digital video camera, or the like, it is possible to improve use efficiency of light in the visible wavelength range while shielding light in the near-infrared wavelength range, which is advantageous in view of suppression of noise in dark part imaging.

In the near-infrared absorbing layer 2, the content of the dye (A) to 100 parts by mass of the transparent resin (B) is preferably 0.1 to 20 parts by mass, more preferably 0.1 to 6 parts by mass, and especially preferably 0.5 to 6 parts by mass. When the content is within the above range, the near-infrared absorbing layer can be made thin, which is preferable.

Besides the dye (A) and the transparent resin (B), the near-infrared absorbing layer 2 may contain optional components as required within a range not obstructing the effects of the present invention. Concrete examples of the optional components are a near-infrared or infrared absorbent, a color tone correcting dye, an ultraviolet absorbent, a leveling agent, an antistatic agent, a heat stabilizer, a light stabilizer, an antioxidant, a dispersing agent, a flame retardant, a lubricant, a plasticizer, and the like. Other examples are components added to a later-described coating liquid used when the near-infrared absorbing layer is formed, for example, a silane coupling agent, a thermal polymerization initiator or photopolymerization initiator, a component originating in a polymerization catalyst, and the like. The content of these optional components in the near-infrared absorbing layer is preferably 15 parts by mass or less to 100 parts by mass of the transparent resin (B).

A film thickness of the near-infrared absorbing layer 2 is not particularly limited, and is appropriately decided according to an intended use, that is, arrangement space in a device where it is used, a required absorbing property, and so on. The film thickness is preferably 0.1 μm to 100 μm. When the film thickness is less than 0.1 μm, it may not be possible to sufficiently exhibit the near-infrared absorbing capability. Further, when the film thickness is over 100 μm, flatness of the film lowers, which may cause variation in absorptance. The film thickness is more preferably 1 to 50 μm. When it is within this range, the sufficient near-infrared absorbing capability and the flatness of the film thickness can both be realized.

As the aforesaid near-infrared or infrared absorbent, one not impairing the effect by the aforesaid optical property of the dye (A), preferably, the dye (A1), is used. As such a near-infrared or infrared absorbent, inorganic particles are preferably used, and concretely, particles of ITO (Indium Tin Oxides), ATO (Antimony-doped Tin Oxides), cesium tungstate, lanthanum boride, or the like are used. Among all, ITO particles and cesium tungstate particles have a high transmittance for light in the visible wavelength range and also have an absorbing property for light in a wide range including the infrared wavelength range over 1200 nm, and thus are especially preferable when a shielding property for light in the infrared wavelength range is required.

A number average aggregated particle size of the ITO particles and the cesium tungstate particles is preferably 5 nm to 200 nm, more preferably 5 nm to 100 nm, and still more preferably 5 nm to 70 nm in view of suppressing scattering and maintaining transparency. Here, in this description, the number average aggregated particle size refers to a value measured by using a dynamic light scattering particle size distribution analyzer, regarding a dispersion liquid for particle size measurement in which sample particles are dispersed in a dispersion medium such as water or alcohol.

The content of the near-infrared or infrared absorbent is preferably 0.1 to 15 parts by mass, and more preferably 0.3 to 10 parts by mass to 100 parts by mass of the transparent resin (B). Consequently, it is possible for the near-infrared or infrared absorbent to exhibit its function while ensuring other physical properties that the near-infrared absorbing layer is required to have.

Preferable examples of the ultraviolet absorbent are a benzotriazole-based ultraviolet absorbent, a benzophenone-based ultraviolet absorbent, a salicylate-based ultraviolet absorbent, a cyanoacrylate-based ultraviolet absorbent, a triazine-based ultraviolet absorbent, an okizanirido-based ultraviolet absorbent, a nickel complex salt-based ultraviolet absorbent, an inorganic ultraviolet absorbent, and the like. Examples of a commercially available product are a brand name "TINUVIN 479" manufactured by Ciba Corporation, and the like.

Examples of the inorganic ultraviolet absorbent are particles of zinc oxide, titanium oxide, cerium oxide, zirconium oxide, mica, kaolin, sericite, and the like. A number average aggregated particle size of the inorganic ultraviolet absorbent is preferably 5 nm to 200 nm, more preferably 5 nm to 100 nm, and still more preferably 5 nm to 70 nm in view of transparency.

The content of the ultraviolet absorbent to 100 parts by mass of the transparent resin (B) is preferably 0.01 to 10 parts by mass, and more preferably 0.05 to 5 parts by mass. Consequently, it is possible for the ultraviolet absorbent to exhibit its function while ensuring other physical properties that the near-infrared absorbing layer is required to have.

Examples of the light stabilizer are hindered amines, and nickel complexes such as nickelbis(octylphenyl)sulfide, nickel complex-3,5-di-tert-butyl-4-hydroxybenzyl phosphate monoethylate, and nickel dibutyldithiocarbamate. One of these may be solely used, or two or more of these may be co-used. The content of the light stabilizer to 100 parts by mass of the transparent resin (B) is preferably 0.01 to 10 parts by mass, and more preferably 0.5 to 5 parts by mass.

Examples of the silane coupling agent are aminosilanes such as 3-aminopropyltriethoxysilane, N-2-(aminoethyl)-3-aminopropyltrimethoxysilane, N-2-(aminoethyl)-N'-2-(aminoethyl)-3-aminopropyltriethoxysilane, and 3-anilinopropyltrimethoxysilane, epoxysilanes such as 3-glycidoxypropyltrimethoxysilane and 2-(3,4-epoxycyclohexyl)ethyltrimethoxysilane, vinylsilanes such as vinyltrimethoxysilane and N-2-(N-vinylbenzylaminoethyl)-3-aminopropyltrimethoxysilane, 3-methacryloxypropyltrimethoxysilane, 3-chloropropyltrimethoxysilane, 3-mercaptopropyl trimethoxysilane, (3-ureidopropyl)trimethoxysilane, and the like.

The kind of the used silane coupling agent can be appropriately selected according to the transparent resin (B) used in combination. The content of the silane coupling agent in the later-described coating liquid is preferably 1 to 20 parts by mass, and more preferably 5 to 15 parts by mass to 100 parts by mass of the transparent resin (B).

Examples of the photopolymerization initiator are acetophenones, benzophenones, benzoins, benzyls, Michler's ketones, benzoin alkylethers, benzyl dimethyl ketals, thioxanthones, and the like. Further, examples of the thermal polymerization initiator are azobis-based and peroxide-based polymerization initiators. One of these may be solely used, or two or more of these may be co-used. The content of the photopolymerization initiator or thermal polymerization initiator in the later-described coating liquid is preferably 0.01 to 10 parts by mass, and more preferably 0.5 to 5 parts by mass to 100 parts by mass of the transparent resin (B).

The near-infrared absorbing layer 2 can be manufactured by, for example, coating the glass substrate 1 with the coating liquid which is prepared by dispersing and dissolving the dye (A) and the transparent resin (B) or the raw material component of the transparent resin (B) in a solvent, followed by drying and, when necessary, curing. By being formed by such a method, the near-infrared absorbing layer 2 can be uniformly formed with a desired film thickness. When the near-infrared absorbing layer 2 contains the above-described optional components, the coating liquid contains the optional components.

The aforesaid solvent is not particularly limited, provided that it is a dispersion medium in which the dye (A) and the transparent resin (B) or the raw material component of the transparent resin (B) can be stably dispersed, or provided that it is a solvent in which they can be dissolved. Note that, in the present description, the term "solvent" is used as a concept including both the dispersion medium and the solvent. Concrete examples of the solvent are: ketones such as acetone and cyclohexane; ethers such as tetrahydrofuran, 1,4-dioxane, and 1,2-dimethoxyethane; esters such as ethyl acetate, butyl acetate, and methoxyethyl acetate; alcohols such as methanol, ethanol, 1-propanol, 2-propanol, 1-butanol, 2-butanol, 2-methyl-1-propanol, 2-methoxyethanol, 4-methyl-2-pentanol, 2-butoxyethanol, 1-methoxy-2-propanol, and diacetone alcohol; hydrocarbons such as n-hexane, n-heptane, isooctane, benzene, toluene, xylene, gasoline, light oil, and kerosene; acetonitrile, nitromethane, water, and the like. One of these may be solely used, or two or more of these may be co-used.

An amount of the solvent to 100 parts by mass of the transparent resin (B) is preferably 10 to 5000 parts by mass, and especially preferably 30 to 2000 parts by mass. Incidentally, the content of a nonvolatile component (solid content) in the coating liquid is preferably 2 mass % to 50 mass %, and especially preferably 5 mass % to 40 mass % to the total amount of the coating liquid.

For the preparation of the coating liquid, a stirring device such as a magnetic stirrer, a planetary centrifugal mixer, a bead mill, a planetary mill, or an ultrasonic homogenizer is usable. In order to ensure high transparency, sufficient stirring is preferably performed. The stirring may be continuous or may be intermittent.

For applying the coating liquid, a coating method such as an immersion coating method, a cast coating method, a spray coating method, a spinner coating method, a bead coating method, a wire bar coating method, a blade coating method, a roller coating method, a curtain coating method, a slit die coater method, a gravure coater method, a slit reverse coater method, a micro gravure method, an ink-jet method, or a comma coater method is usable. Besides, a bar coater method, a screen printing method, a flexographic printing method, or the like is usable.

As a result of the drying following the application of the coating liquid on the glass substrate 1, the near-infrared absorbing layer 2 is formed on the glass substrate 1. When the coating liquid contains the raw material component of the transparent resin (B), the curing treatment is further performed. When the reaction is thermal-curing, the drying and the curing can be performed at the same time, but when it is photo-curing, the curing treatment is provided separately from the drying.

By thus forming the near-infrared absorbing layer 2 directly on the glass substrate 1, it is possible to obtain the NIR filter 10A simultaneously with the manufacture of the near-infrared absorbing layer 2. As a method to manufacture the NIR filter 10A, the above-described method of forming the near-infrared absorbing layer 2 directly on the glass substrate 1 is preferable in view of workability and in view of performance of the obtained NIR filter 10A.

Incidentally, the near-infrared absorbing layer 2 can be manufactured in a film form by extrusion molding, depending on the kind of the transparent resin (B), and it is also possible to stack a plurality of thus manufactured films to integrate them by thermocompression bonding or the like. Further, it is also possible to manufacture it by peeling the near-infrared absorbing layer 2 formed on a peelable substrate. The NIR filter 10A may be manufactured by using the near-infrared absorbing layer 2 thus obtained as a simple substance, and in this case, by pasting the near-infrared absorbing layer 2 on the glass substrate 1 by using, for example, an adhesive or the like by a common procedure, it is possible to manufacture the NIR filter 10A.

(Dielectric Multilayered Film)

The NIR filter of the present invention may be structured to have the near-infrared absorbing layer 2 and the glass substrate 1, one per each, as in the NIR filter 10A illustrated in FIG. 1, may have a structure in which the near-infrared absorbing layer 2 is sandwiched by two sheets of the glass substrates 1, or may have a structure in which the near-infrared absorbing layers 2 are formed or pasted on both principal surfaces of the glass substrate 1. Alternatively, a stack of the near-infrared absorbing layer 2 and the glass substrate 1 may form the NIR filter together with other constituent elements. The other constituent elements are an anti-reflection film, a reflective film that reflects light in a specific wavelength range, a selected wavelength shielding layer that controls transmission and shielding of light in specific wavelength ranges, a radiation shielding film that shields radioactive rays such as a rays, and the like. When the NIR filter of the present invention has these various kinds of functional films and functional layers, they are each preferably formed of a dielectric multilayered film.

The NIR filter of the present invention may be used in a state of being pasted on a low-pass filter having ultraviolet shielding capability as a selected wavelength shielding layer. Further, a light shielding member in a black frame shape may be disposed on an end portion of a principal surface of the NIR filter. In the NIR filter, a position where the light shielding member is disposed may be one or both of the principal surfaces, or may be a side surface.

A face, of the NIR filter 10A, pasted on the low-pass filter may be either a near-infrared absorbing layer 2-side face or a glass substrate 1-side face of the NIR filter 10A, and can be appropriately selected. When the near-infrared absorbing layer 2-side face is pasted on the low-pass filter via the adhesive, it is preferable to provide a dielectric film having about 50 nm to 500 nm thickness on the near-infrared absorbing layer 2.

Consequently, it is possible to prevent the transparent resin (B) contained in the near-infrared absorbing layer 2 from being dissolved by the aforesaid adhesive. A constituent material of the dielectric film may be appropriately selected from materials not impairing spectral properties after the pasting, such as $SiO_2$, $SiO_xN_y$, $MgF_2$, $ZrO_2$, $Ta_2O_5$, and $TiO_2$. The NIR filter 10A may have, on one or both of the principal surfaces, the aforesaid anti-reflection film, reflective film, selected wavelength shielding film, radiation shielding film, or the like, according to its intended use.

Figure 2:
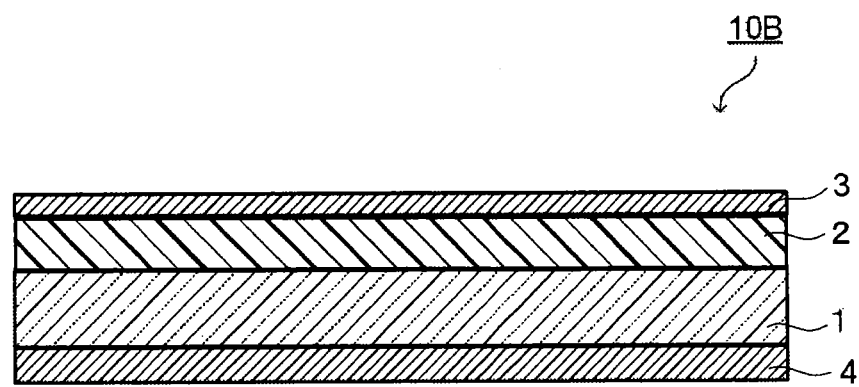
FIG. 2 is a cross-sectional view schematically illustrating another example of the near-infrared cut filter according to the embodiment of the present invention.

FIG. 2 is a cross-sectional view schematically illustrating another example of the NIR filter according to the embodiment of the present invention. A NIR filter 10B illustrated in FIG. 2 is composed of a glass substrate 1, a near-infrared absorbing layer 2 formed on one principal surface of the glass substrate 1, further a first dielectric multilayered film 3 formed on a face, of the near-infrared absorbing layer 2, opposite the glass substrate 1, that is, on a surface of the near-infrared absorbing layer 2, and a second dielectric multilayered film 4 formed on a face, of the glass substrate 1, opposite the near-infrared absorbing layer 2, that is, on a surface of the glass substrate 1. The glass substrate 1 and the near-infrared absorbing layer 2 can be the same as those of the above-described NIR filter 10A.

Here, the NIR filter 10B is structured to have the first dielectric multilayered film 3 and the second dielectric multilayered film 4 on the surface of the near-infrared absorbing layer 2 and the surface of the glass substrate 1 respectively. As required, the NIR filter of the present invention may be structured to have the dielectric multilayered film only on the surface of the near-infrared absorbing layer, or may be structured to have the dielectric multilayered film only on the surface of the glass substrate, out of the surface of the near-infrared absorbing layer and the surface of the glass substrate.

The first dielectric multilayered film 3 and the second dielectric multilayered film 4 are films each having optical functions obtained by alternately stacking a dielectric film with a low refractive index and a dielectric film with a high refractive index. Depending on how they are designed, they are each usable as an anti-reflection film, a reflective film, a selected wavelength shielding layer, or the like that is made to exhibit the function of controlling transmission and shielding of light in specific wavelength ranges by utilizing light interference. Note that the low refractive index and the high refractive index mean to have a higher refractive index and a lower refractive index than a refractive index of an adjacent layer.

As for a high-refractive index material forming the dielectric film with the high refractive index and a low-refractive index material forming the dielectric film with the low refractive index, two kinds of materials different in refractive index are prepared and a material with a high refractive index may be used as the high-refractive index material and a material with a low refractive index may be used as the low-refractive index material.

Concretely, it is preferable that a material whose refractive index is 1.45 or more and less than 1.55 is used as the low-refractive index material and a material whose refractive index is not less than 2.2 nor more than 2.5 is used as the high-refractive index material to form the dielectric multilayered film.

More concretely, examples of the low-refractive index material are $SiO_2$ (1.45), $SiO_xN_y$ (1.46 or more and less than 1.55), $MgF_2$ (1.38), and the like. Among these, in the present invention, the low-refractive index material whose refractive index is within the aforesaid range is preferable, and $SiO_2$ is especially preferable in view of reproducibility, stability, and economic efficiency in film formability, and so on. Note that the numbers in the parentheses after the compounds each indicate the refractive index. Hereinafter, also regarding the high-refractive index material, numbers in parentheses after compounds each indicate the refractive index.

More concretely, examples of the high-refractive index material are $Ta_2O_5$ (2.22), $TiO_2$ (2.41), $Nb_2O_5$ (2.3), $ZrO_2$ (1.99), and the like. Among these, in the present invention, the high-refractive index material whose refractive index is within the aforesaid range is preferable, and $TiO_2$ or the like is especially preferably used, when film formability, the refractive index, and so on including reproducibility and stability thereof are comprehensively considered.

As for the first dielectric multilayered film 3 and the second dielectric multilayered film 4, their concrete number of layers and film thicknesses, and the refractive indexes of the used high-refractive index material and low-refractive index material can be designed by using a conventional method, according to required optical properties. Further, the dielectric multilayered film can be manufactured so as to conform to these designs.

The number of layers of the dielectric multilayered film is preferably 2 to 100, and more preferably 2 to 80, as the total number of stacked layers of the dielectric film with the low refractive index and the dielectric film with the high refractive index, though differing depending on the optical property that the dielectric multilayered film has. Increasing the total number of the stacked layers elongates a tact time at the time of the manufacture and causes a warp and the like of the dielectric multilayered film, and further increases the film thickness of the dielectric multilayered film, and therefore, the total number of the stacked layers is preferably the aforesaid upper limit or less. It is preferable that the number of layers is smaller so long as the required optical property is ensured. So long as the low-refractive index dielectric film and the high-refractive index dielectric film are alternately stacked, they may be stacked in any order, that is, the first layer may be the low-refractive index film or may be the high-refractive index film.

The film thickness of the dielectric multilayered film is preferably small in view of thinning of the NIR filter, provided that the aforesaid preferable number of the stacked layers is satisfied. The film thickness of such a dielectric multilayered film is preferably 2 μm to 10 μm, though differing depending on the optical property that the dielectric multilayered film has. When the dielectric multilayered film is used as the anti-reflection layer, its film thickness is preferably 0.1 μm to 1 μm. Further, when the first dielectric multilayered film 3 and the second dielectric multilayered film 4 are disposed on the surface of the near-infrared absorbing layer 2 and the surface of the glass substrate 1 respectively, as in the NIR filter 10B, a warp sometimes occurs due to a stress of the dielectric multilayered films. In order to suppress the occurrence of this warp, a difference in film thickness between the dielectric multilayered films formed on the respective surfaces is preferably as small as possible, provided that the dielectric multilayered films are formed so as to have desired selective wavelength shielding properties.

For forming the dielectric multilayered film, a vacuum film forming process such as a CVD method, a sputtering method, or a vacuum deposition method, a wet film forming process such as a spray method or a dip method, or the like is usable, for instance.

In the NIR filter 10B, the first dielectric multilayered film 3 is preferably designed as a film having an anti-reflection function. When the first dielectric multilayered film 3 is the anti-reflection film, this dielectric multilayered film (anti-reflection film) has functions to improve a transmittance and efficiently utilize incident light, by preventing the reflection of light incident on the NIR filter 10B, and can be designed by a common procedure by using the aforesaid materials, and can be formed by the aforesaid method according to the design.

The second dielectric multilayered film 4 preferably has a wavelength selecting property of transmitting light in the visible range and shielding light with wavelengths not in the aforesaid light-shielding ranges of the glass substrate 1 and the near-infrared absorbing layer 2. Incidentally, in this case, a light-shielding range of the second dielectric multilayered film 4 may include the light shielding ranges, in the near-infrared wavelength range, of the glass substrate 1 and the near-infrared absorbing layer 2.

As such a second dielectric multilayered film 4, a dielectric multilayered film having the following optical properties is preferable.

(ii-1) a transmittance in a 420 nm to 650 nm wavelength range is 90% or more,
(ii-2) a transmittance in a 750 nm to 1100 nm wavelength range is 10% or less, and
(ii-3) a wavelength on a shortest wavelength side for which a transmittance in a wavelength range longer than 600 nm is 50% exists in a wavelength range of over 650 nm and 730 nm or less.

By satisfying the condition (ii-1), it is possible to enhance use efficiency of light in the visible light range. Therefore, the higher the transmittance in (ii-1) is, the more preferable, and 95% or more is more preferable. By satisfying the condition (ii-2), it is possible to sufficiently shield light in near-infrared and infrared ranges. Consequently, it is possible to suppress the entrance of near-infrared light to an image sensor to decrease noise. The transmission in (ii-2) is more preferably 5% or less. Further, when the condition (ii-3) is satisfied, the NIR filter can be one having light shielding performance, without any gap between the light shielding ranges of the second dielectric multilayered film, the light shielding ranges in the near-infrared wavelength range, of the glass substrate and the near-infrared absorbing layer.

The transmittance of such a second dielectric multilayered film 4 is more preferably 1% or less for light in the ultraviolet wavelength range of 400 nm or less. Especially preferably, its transmittance for 410 nm light or less is 1% or less.

Here, in the NIR filter 10B, the shielding of light in a predetermined wavelength range is achieved by the second dielectric multilayered film 4 provided only on the surface of the glass substrate 1, but the function of shielding the light in the same predetermined wavelength range may be achieved by the combination of a plurality of sheets of the dielectric multilayered films, as required. When, for example, the NIR filter 10A is used, the dielectric multilayered film having such a function of shielding the selected wavelength may be disposed on only one of the surface of the near-infrared absorbing layer 2 and the surface of the glass substrate 1, or may be disposed on the both, according to an intended use of the NIR filter of the present invention. The number of the disposed dielectric multilayered films is not limited. One dielectric multilayered film or more may be disposed on one of the surfaces, or independently one or more of the dielectric multilayered films may be disposed on each of the both. The stacking order of the constituent elements of the NIR filter of the present invention is not particularly limited. It is appropriately set according to the intended use of the NIR filter of the present invention.

Further, in the NIR filter of the present invention, a structure for reducing surface reflection, such as a moth-eye structure may be provided in order to enhance use efficiency of light. The moth-eye structure is a structure in which regular projection arrays are formed at a pitch smaller than, for example, 400 nm, and since an effective refractive index continuously changes in a thickness direction, it is a structure to suppress a surface reflectance of light with a wavelength longer than the pitch, and can be formed by molding or the like on the surface of the NIR filter, for example, on the first dielectric multilayered film 3 in the case of the NIR filter 10B illustrated in FIG. 2.

Further, a layer having a structure other than that of the dielectric multilayered film may be adopted, provided that it is a layer having the function to shield the selected wavelength as described above. For example, as a layer that contains at least one selected from a near-infrared or infrared light absorbent, a color tone correcting dye, and an ultraviolet absorbent and absorbs light with a specific wavelength, it may be a light absorbing layer in which any of the absorbents are dispersed in a transparent resin by a conventionally known method. Examples of the transparent resin are thermoplastic resins such as a polyester resin, an acrylic resin, a polyolefin resin, a polycarbonate resin, a polyamide resin, and an alkyd resin, resins cured by heat or light such as an ene-thiol resin, an epoxy resin, a thermosetting acrylic resin, a light-curing acrylic resin, and a silsesquioxane resin, and the like. The content of each of these absorbents in the light absorbing layer is appropriately adjusted within a range not impairing the effects of the present invention, according to light absorbing capability of each of the absorbents.

As such a light absorbing layer, an infrared absorbing layer in which ITO particles are dispersed in the transparent resin is usable, for instance. The content of the ITO particles can be the same as that in the case of the near-infrared absorbing layer. Consequently, it is possible to maintain transparency without exhibiting the absorption of light in the visible wavelength range.

Adding a dye as the light absorbing layer in order to absorb near-infrared light or infrared light in a wide wavelength range is generally often accompanied by the absorption of the visible range, and from this point of view, using the near-infrared absorbing glass substrate made of the CuO-containing fluorophosphate glass or the CuO-containing phosphate glass according to the present invention is preferable because it is possible to absorb the near-infrared light or the infrared light while keeping the absorption of the visible light range low. Further, when a plurality of kinds of dyes are mixed in the same absorbing layer, deterioration due to heat or the like sometimes more noticeably occurs, and in this respect as well, the use of the near-infrared absorbing glass substrate made of the CuO-containing fluorophosphate glass or the CuO-containing phosphate glass according to the present invention is more preferable.

Even when having the dielectric multilayered film having the function of shielding a selected wavelength as in the NIR filter 10B illustrated in FIG. 2, by having the structure in which the near-infrared absorbing layer 2 and the glass substrate 1 are stacked, the NIR filter of the present invention is capable of almost completely eliminating an influence of angle dependence that the dielectric multilayered film inherently has, which dependence is a shift of a shielded wavelength depending on an angle of incidence of light. The angle dependence can be evaluated by, for example, measuring a transmittance ($T_0$) of the NIR filter when the angle of incidence is 0° (when an incidence direction is perpendicular to the principal surface) and its transmittance ($T_{30}$) when the angle of incidence is 30° and using, as an index, an area of a 550 nm to 750 nm wavelength range in a difference spectrum which is obtained by subtracting $T_{30}$ from $T_0$.

It can be said that the smaller this area is, the more the angle dependence that the dielectric multilayered film has is eliminated, and the light shielding property in the near-infrared range is sufficiently ensured in a wide wavelength range without any influence of the angle of incidence. For example, when a NIR filter (1) having a dielectric multilayered film which has a function of shielding a selected wavelength, a near-infrared absorbing layer, and a glass substrate in the order mentioned and a NIR filter (2) which has the same structure except in that it does not have the near-infrared absorbing layer are fabricated, it is possible to evaluate the angle dependence of the NIR filter (1) based on a ratio between an area (A) of the 550 nm to 750 nm wavelength range in the aforesaid difference spectrum, of the NIR filter (1) which is obtained by subtracting $T_{30}$ from $T_0$, and an area (B) of the 550 nm to 750 nm wavelength range in the aforesaid difference spectrum, of the NIR filter (2) which is obtained by subtracting $T_{30}$ from $T_0$. In the NIR filter of the present invention, a value of this ratio (area (A)/area (B)) is preferably 0.9 or less, and more preferably 0.8 or less.

In the foregoing, the embodiment of the present invention is described, taking the NIR filter 10A and the NIR filter 10B illustrated in FIG. 1 and FIG. 2 as examples, but the NIR filter of the present invention is not limited to these. Its structure can be appropriately changed within a limit not departing from the spirit of the present invention and as required.

The NIR filter of the present invention is usable as a NIR filter for imaging devices such as a digital still camera, a digital video camera, a monitoring camera, an on-vehicle camera, and a web camera, or of an automatic exposure meter, and the like, as a NIR filter for PDP, and so on. The NIR filter of the present invention is suitably used in solid-state imaging devices such as a digital still camera, a digital video camera, a monitoring camera, an on-vehicle camera, and a web camera, and the NIR filter is disposed, for example, between an imaging lens and a solid-state image sensor.

[Solid-State Imaging Device]

Hereinafter, an example of a solid-state imaging device of the present invention using the NIR filter of the present invention disposed between an imaging lens and a solid-state image sensor will be described with reference to FIG. 3.

Figure 3:
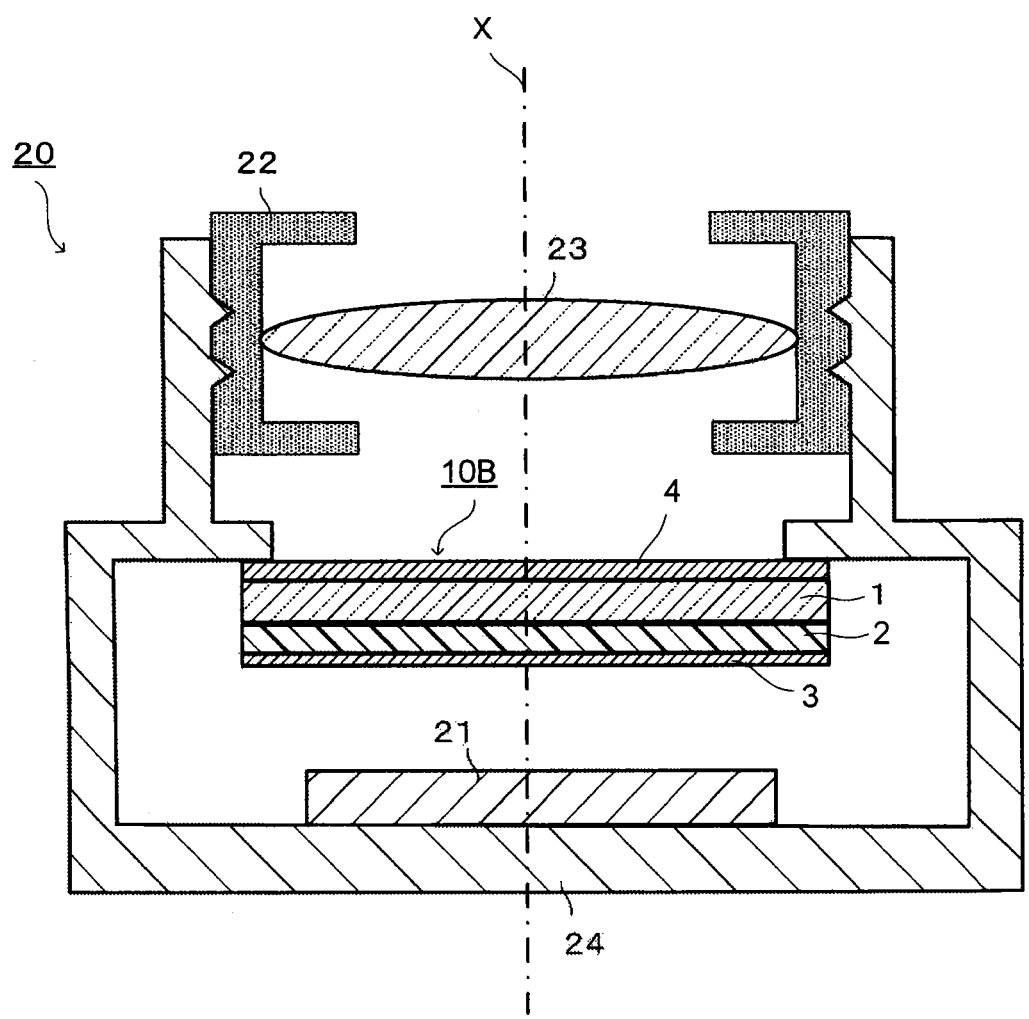
FIG. 3 is a cross-sectional view illustrating an example of an embodiment of a solid-state image device of the present invention.

FIG. 3 is a cross-sectional view schematically illustrating an essential part of the example of a solid-state imaging device using the above-described NIR filter 10B. As illustrated in FIG. 3, this solid-state imaging device 20 has a solid-state image sensor 21, and in front thereof, the NIR filter 10B and an imaging lens 23 in this order, and further has a casing 24 fixing these. The imaging lens 23 is fixed by a lens unit 22 further provided inside the casing 24. The NIR filter 10B is disposed so that the first dielectric multilayered film 3 is located on a solid-state image sensor 21 side and the second dielectric multilayered film 4 is located on an imaging lens 23 side. The solid-state image sensor 21 and the imaging lens 23 are disposed along an optical axis X. A direction when the NIR filter is thus installed in the device is appropriately selected according to design.

The solid-state imaging device of the present invention uses the NIR filter of the present invention which is a NIR filter effectively using the near-infrared absorbing glass and the near-infrared absorbing dye and excellent in the near-infrared shielding property, and whose angle dependence is eliminated even when it has the dielectric multilayered film, and thus is a high-sensitivity solid-state imaging device.

EXAMPLES

Hereinafter, the present invention will be described in more detail based on examples. The present invention is not limited at all to the embodiments and the examples described below. Examples 1 to 11 and examples 14 to 24 are the examples of the present invention, and examples 12, 13 and examples 25, 26 are comparative examples. NIR filters of the examples 1 to 11 are NIR filters each having the same cross section as that illustrated in FIG. 1. NIR filters of the examples 14 to 24 are NIR filters each having the same cross section as that illustrated in FIG. 2.

[1] NIR Filter being Composed of Glass Substrate and Near-Infrared Absorbing Layer Example 1

A squarylium-based dye (compound (F11-2)) as a NIR absorbing dye was mixed in a cyclohexanone solution containing 15 mass % of a polyester resin (manufactured by Osaka Gas Chemicals Co., Ltd., brand name: B-OKP2, refractive index 1.63) at a ratio of 0.6 parts by mass to 100 parts by mass of the polyester resin, followed by stirring and dissolving at room temperature, whereby a coating liquid was obtained. The obtained coating liquid was applied on a fluorophosphate glass (manufactured by Asahi Glass Co., Ltd, brand name: NF50-E) plate with a 0.56 mm thickness as a substrate by a die coating method by using an applicator with a 30 μm gap, and was dried by five-minute heating at 100° C., whereby a NIR filter 1 in which a near-infrared absorbing layer with a 2.3 μm film thickness was formed was obtained. Results of transmittances (an average transmittance for 400 nm to 550 nm and an average transmittance for 650 nm to 720 nm) of the NIR filter 1 which were measured by using a spectrophotometer (brand name: U4100) manufactured by Hitachi, Ltd. are presented in Table 2.

Example 2

A squarylium-based dye (compound (F11-3)) as a NIR absorbing dye was mixed in a cyclohexanone solution containing 15 mass % of a polyester resin (manufactured by Osaka Gas Chemicals Co., Ltd., brand name: B-OKP2, refractive index 1.63) at a ratio of 0.6 parts by mass to 100 parts by mass of the polyester resin, followed by stirring and dissolving at room temperature, whereby a coating liquid was obtained. The obtained coating liquid was applied on a fluorophosphate glass (manufactured by Asahi Glass Co., Ltd, brand name: NF50-E) plate with a 0.56 mm thickness as a substrate by a die coating method by using an applicator with a 30 μm gap, and was dried by five-minute heating at 100° C., whereby a NIR filter 2 in which a near-infrared absorbing layer with a 2.3 μm film thickness was formed was obtained. Results of transmittances of the NIR filter 2 which were measured by using the spectrophotometer (brand name: U4100) manufactured by Hitachi, Ltd. are presented in Table 2.

Example 3

A squarylium-based dye (compound (F12-1)) as a NIR absorbing dye was mixed in a cyclohexanone solution containing 15 mass % of a polyester resin (manufactured by Osaka Gas Chemicals Co., Ltd., brand name: B-OKP2, refractive index 1.63) at a ratio of 1.0 part by mass to 100 parts by mass of the polyester resin, followed by stirring and dissolving at room temperature, whereby a coating liquid was obtained. The obtained coating liquid was applied on a fluorophosphate glass (manufactured by Asahi Glass Co., Ltd, brand name: NF50-E) plate with a 0.56 mm thickness as a substrate by a die coating method by using an applicator with a 30 μm gap, and was dried by five-minute heating at 100° C., whereby a NIR filter 3 in which a near-infrared absorbing layer with a 2.3 μm film thickness was formed was obtained. Results of transmittances of the NIR filter 3 which were measured by using the spectrophotometer (brand name: U4100) manufactured by Hitachi, Ltd. are presented in Table 2.

Example 4

A squarylium-based dye (compound (F11-3)) as a NIR absorbing dye was mixed in a cyclohexanone solution containing 15 mass % of a polyisobutyl methacrylate resin (manufactured by Tokyo Chemical Industry Co., Ltd., refractive index 1.48, hereinafter abbreviated as "PIBM".) at a ratio of 0.6 parts by mass to 100 parts by mass of the acrylic resin, followed by stirring and dissolving at room temperature, whereby a coating liquid was obtained. The obtained coating liquid was applied on a fluorophosphate glass (manufactured by Asahi Glass Co., Ltd, brand name: NF50-E) plate with a 0.56 mm thickness as a substrate by a die coating method by using an applicator with a 30 μm gap, and was dried by five-minute heating at 100° C., whereby a NIR filter 4 in which a near-infrared absorbing layer with a 2.3 μm film thickness was formed was obtained. Results of transmittances of the NIR filter 4 which were measured by using the spectrophotometer (brand name: U4100) manufactured by Hitachi, Ltd. are presented in Table 2.

Example 5

A squarylium-based dye (compound (F11-4)) as a NIR absorbing dye was mixed in a cyclohexanone solution containing 15 mass % of a polycarbonate resin (manufactured by Teijin Chemicals Co., Ltd., brand name: SP3810, refractive index 1.64, hereinafter abbreviated as "SP3810".) at a ratio of 2.0 parts by mass to 100 parts by mass of the polycarbonate resin, followed by stirring and dissolving at room temperature, whereby a coating liquid was obtained. The obtained coating liquid was applied on a fluorophosphate glass (manufactured by Asahi Glass Co., Ltd, brand name: NF50-E) plate with a 0.56 min thickness as a substrate by a die coating method by using an applicator with a 30 μm gap, and was dried by five-minute heating at 100° C., whereby a NIR filter 5 in which a near-infrared absorbing layer with a 1.1 μm film thickness was formed was obtained. Results of transmittances of the NIR filter 5 which were measured by using the spectrophotometer (brand name: U4100) manufactured by Hitachi, Ltd. are presented in Table 2.

Example 6

A squarylium-based dye (compound (F11-5)) as a NIR absorbing dye was mixed in a cyclohexanone solution containing 7 mass % of a polyester resin (manufactured by Osaka Gas Chemicals Co., Ltd., brand name: B-OKP2, refractive index 1.63) at a ratio of 3.0 parts by mass to 100 parts by mass of the polyester resin, followed by stirring and dissolving at room temperature, whereby a coating liquid was obtained. The obtained coating liquid was applied on a fluorophosphate glass (manufactured by Asahi Glass Co., Ltd, brand name: NF50-EX) plate with a 0.23 mm thickness as a substrate by a spin coating method, and was dried by sixty-minute heating at 150° C., whereby a NIR filter 6 in which a near-infrared absorbing layer with a 1 μm film thickness was formed was obtained. Results of transmittances of the NIR filter 6 which were measured by using the spectrophotometer (brand name: U4100) manufactured by Hitachi, Ltd. are presented in Table 2.

Example 7

A squarylium-based dye (S2084 (brand name, manufactured by FEW Chemicals GmbH) as a NIR absorbing dye and a tetrahydrofuran solution containing 50 mass % of an acrylic monomer (manufactured by Osaka Gas Chemicals Co., Ltd., brand name: OGSOL EA-F5003, refractive index as resin 1.59) were mixed at a ratio so that, to 100 parts by mass of the acrylic monomer (the same amount as the obtained acrylic resin), the aforesaid squarylium-based dye became 2.5 parts by mass and IRGACURE184 (brand name, 1-hydroxy-cyclohexyl-phenyl-ketone, manufactured by BASF) as a photopolymerization initiator became 2.0 parts by mass, followed by stirring and dissolving at room temperature, whereby a coating liquid was obtained. The obtained coating liquid was applied on a fluorophosphate glass (manufactured by Asahi Glass Co., Ltd, brand name: NF50-E) plate with a 0.56 mm thickness by a die coating method by using an applicator with a 30 μm gap, and was dried by five-minute heating at 100° C. Thereafter, a coating film was irradiated with 360 mJ/cm² ultraviolet light having 365 nm wavelength to be cured, whereby a NIR filter 7 in which a near-infrared absorbing layer with an 8 μm film thickness was formed on the fluorophosphate glass plate was obtained. Results of transmittances of the NIR filter 7 which were measured by using the spectrophotometer (brand name: U4100) manufactured by Hitachi, Ltd. are presented in Table 2.

Example 8

A phthalocyanine-based dye (FB22 (brand name, Yamada Chemical Co., Ltd.)) as a NIR absorbing dye was mixed in a cyclohexanone solution containing 15 mass % of a polyester resin (manufactured by TOYOBO Co., Ltd, brand name: VYLON103, refractive index 1.58), at a ratio of 0.5 parts by mass to 100 parts by mass of the polyester resin, followed by stirring and dissolving at room temperature, whereby a coating liquid was obtained. The obtained coating liquid was applied on a fluorophosphate glass (manufactured by Asahi Glass Co., Ltd, brand name: NF50-E) plate with a 0.56 mm thickness as a substrate by a die coating method by using an applicator with a 30 μm gap, and was dried by five-minute heating at 100° C., whereby a NIR filter 8 in which a near-infrared absorbing layer with a 2.3 μm film thickness was formed was obtained. Results of transmittances of the NIR filter 8 which were measured by using the spectrophotometer (brand name: U4100) manufactured by Hitachi, Ltd. are presented in Table 2.

Example 9

A cyanine-based dye (ADS680HO (brand name, manufactured by American Dye. Source, Inc.)) as a NIR absorbing dye and a tetrahydrofuran solution containing 50 mass % of an acrylic monomer (manufactured by Osaka Gas Chemicals Co., Ltd., brand name: OGSOL EA-F5003, refractive index as resin 1.59) were mixed at a ratio so that, to 100 parts by mass of the acrylic monomer (the same amount as the obtained acrylic resin), the cyanine-based dye became 2.0 parts by mass and IRGACURE184 (brand name, manufactured by BASF) as a photopolymerization initiator became 2.0 parts by mass, followed by stirring and dissolving at room temperature, whereby a coating liquid was obtained. The obtained coating liquid was applied on a fluorophosphate glass (manufactured by Asahi Glass Co., Ltd, brand name: NF50-E) plate with a 0.56 mm thickness by a die coating method by using an applicator with a 30 μm gap, and was dried by five-minute heating at 100° C. Thereafter, a coating film was irradiated with 360 mJ/cm² ultraviolet light having 365 nm wavelength to be cured, whereby a NIR filter 9 in which a near-infrared absorbing layer with an 8 μm film thickness was formed on the fluorophosphate glass plate was obtained. Results of transmittances of the NIR filter 9 which were measured by using the spectrophotometer (brand name: U4100) manufactured by Hitachi, Ltd. are presented in Table 2.

Example 10

A squarylium-based dye (compound (F13-2)) as a NIR absorbing dye was mixed in a cyclohexanone solution containing 15 mass % of a polyester resin (manufactured by Osaka Gas Chemicals Co., Ltd., brand name: B-OKP2, refractive index 1.63) at a ratio of 0.6 parts by mass to 100 parts by mass of the polyester resin, followed by stirring and dissolving at room temperature, whereby a coating liquid was obtained. The obtained coating liquid was applied on a fluorophosphate glass (manufactured by Asahi Glass Co., Ltd, brand name: NF50-E) plate with a 0.56 mm thickness as a substrate by a die coating method by using an applicator with a 30 μm gap, and was dried by five-minute heating at 100° C., whereby a NIR filter 10 in which a near-infrared absorbing layer with a 2.3 μm film thickness was formed was obtained. Results of transmittances of the NIR filter 10 which were measured by using the spectrophotometer (brand name: U4100) manufactured by Hitachi, Ltd. are presented in Table 2.

Example 11

The compound (F12-1) and the compound (F11-2) as NIR absorbing dyes were mixed in a cyclohexanone solution containing 15 mass % of a polyester resin (manufactured by Osaka Gas Chemicals Co., Ltd., brand name: B-OKP2, refractive index 1.63) at ratios of 4.5 parts by mass and 0.9 parts by mass respectively to 100 parts by mass of the polyester resin, followed by stirring and dissolving at room temperature, whereby a coating liquid was obtained. The obtained coating liquid was applied on a fluorophosphate glass (manufactured by Asahi Glass Co., Ltd, brand name: NF50-E) plate with a 0.56 mm thickness as a substrate by a die coating method by using an applicator with a 30 μm gap, and was dried by five-minute heating at 100° C., whereby a NIR filter 11 in which a near-infrared absorbing layer with a 2.3 μm film thickness was formed was obtained. Results of transmittances of the NIR filter 11 which were measured by using the spectrophotometer (brand name: U4100) manufactured by Hitachi, Ltd. are presented in Table 2.

Example 12

As a comparative example, results of spectral transmittances of the fluorophosphate glass (manufactured by Asahi Glass Co., Ltd, brand name: NF50-E) plate with the 0.56 mm thickness used as the substrate in the examples 1 to 11 (except the example 6), which were measured by using the spectrophotometer (brand name: U4100) manufactured by Hitachi, Ltd., are presented in Table 2. The transmittance of this fluorophosphate glass plate in a 750 nm to 1000 nm wavelength range was 10% or less.

Example 13

Further, as another comparative example, results of spectral transmittances of the fluorophosphate glass (manufactured by Asahi Glass Co., Ltd, brand name: NF50-EX) plate with the 0.23 mm thickness used as the substrate in the example 6, which were measured by using the spectrophotometer (brand name; U4100) manufactured by Hitachi, Ltd., are presented in Table 2. The transmittance of this fluorophosphate glass plate in the 750 nm to 1000 nm wavelength range was 15% or less.

(anti-reflection film) 3 and the second dielectric multilayered film 4 were further provided on both sides of the fluorophosphate glasses of the example 12 and the example 13 were fabricated. As the first dielectric multilayered film (anti-reflection film) 3 and the second dielectric multilayered film 4, the same dielectric multilayered films designed and formed as follows were used in all of the example 14 to the example 26.

(Design of Dielectric Multilayered Films)

The second dielectric multilayered film 4 had a structure in which a $TiO_2$ film being a high-refractive index dielectric film and a $SiO_2$ film being a low-refractive index dielectric film were alternately stacked, and was formed by a vapor deposition method.

TABLE 2

| | | NIR absorbing layer | | | | average | |
|---|---|---|---|---|---|---|---|
| | | NIR absorbing dye (A) | | | | transmittance of NIR | |
| | | | part by mass (to | transparent resin (B) | | $\lambda$max in NIR | cut filter (%) |
| | glass substrate | abbreviation of compound | 100 parts by mass of resin) | kind | refractive index | absorbing layer [nm] | 400 nm to 550 nm | 650 nm to 720 nm |
|---|---|---|---|---|---|---|---|---|
| E1 | NF50-E | (F11-2) | 0.6 | B-OKP2 | 1.63 | 715 | 87 | 12 |
| E2 | NF50-E | (F11-3) | 0.6 | B-OKP2 | 1.63 | 706 | 87 | 11 |
| E3 | NF50-E | (F12-1) | 1.0 | B-OKP2 | 1.63 | 686 | 87 | 10 |
| E4 | NF50-E | (F11-3) | 0.6 | PIBM | 1.48 | 698 | 87 | 10 |
| E5 | NF50-E | (F11-4) | 2.0 | SP3810 | 1.64 | 705 | 88 | 12 |
| E6 | NF50-EX | (F11-5) | 3.0 | B-OKP2 | 1.63 | 705 | 86 | 12 |
| E7 | NF50-E | S2084 | 2.5 | EA-F5003 | 1.59 | 679 | 87 | 10 |
| E8 | NF50-E | FB22 | 0.5 | VYLON103 | 1.58 | 681 | 86 | 10 |
| E9 | NF50-E | ADS680HO | 2.0 | EA-F5003 | 1.59 | 694 | 88 | 12 |
| E10 | NF50-E | (F13-2) | 0.6 | B-OKP2 | 1.63 | 715 | 87 | 12 |
| E11 | NF50-E | (F12-1) | 4.5 | B-OKP2 | 1.63 | 689 | 87 | 8 |
| | | (F11-2) | 0.9 | | | | | |
| E12 | NF50-E | — | — | — | — | — | 88 | 18 |
| E13 | NF50-EX | — | — | — | — | — | 87 | 20 |

E1 to E13: Example 1 to Example 13

[2] NIR Filter Having Dielectric Multilayered Film

Example 14 to Example 26

NIR filters further having dielectric multilayered films on both sides of the NIR filters 1 to 11 obtained in the above-described examples 1 to 11, that is, NIR filters of the examples 14 to 24 in which the first dielectric multilayered film (anti-reflection film) 3, the near-infrared absorbing layer 2, the glass substrate 1, and the second dielectric multilayered film 4 which are illustrated in FIG. 2 were stacked in the order mentioned, were fabricated as NIR filters 14 to 24 respectively. Similarly, as example 25 and the example 26, NIR filters 25, 26 in which dielectric multilayered films, that is, the first dielectric multilayered film The structure was decided by conducting a simulation so that it had a desired optical property, by using the number of the stacked layers, a film thickness of the $TiO_2$ film, and a film thickness of the $SiO_2$ film of the second dielectric multilayered film 4 as parameters.

Regarding a transmittance property of the second dielectric multilayered film 4 when an angle of incidence of light was 0°, its transmittance in a 420 nm to 670 nm wavelength range was set to 90% or more, its transmittance in a 730 nm to 1100 nm wavelength range was set to 1% or less, and its transmittance in the whole range of 400 nm or less was set to 5% or less. Further, a wavelength on the shortest wavelength side for which the transmittance of the second dielectric multilayered film 4 becomes 50% in a wavelength range on a longer wavelength side than 600 nm is 680 nm.

Figure 4:
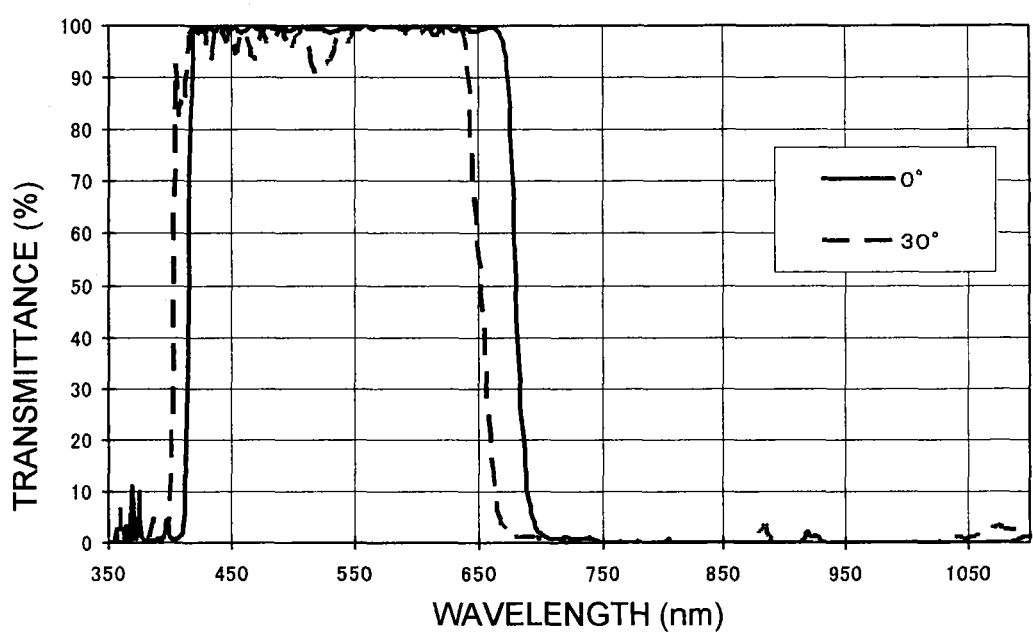
FIG. 4 is a chart illustrating transmission spectra of a dielectric multilayered film used in near-infrared cut filters in examples.

Further, regarding a transmittance property of the second dielectric multilayered film 4 when the angle of incidence of light was 30°, its transmittance in a 400 nm to 600 nm wavelength range was set to 90% or more, its transmittance in a 730 nm to 1100 nm wavelength range was set to 5% or less, and its transmittance in the whole range of 400 nm or less was set to 20% or less. Transmission spectra in a 350 nm to 1100 nm wavelength range of the second dielectric multilayered film 4 are illustrated in FIG. 4. The total number of layers was 52, and the total film thickness was 6.6 μm.

Similarly to the second dielectric multilayered film 4, the first dielectric multilayered film (anti-reflection film) 3 had a structure in which a $TiO_2$ film being a high-refractive index dielectric film and a $SiO_2$ film being a low-refractive index dielectric film were alternately stacked, and was formed by the vapor deposition method. In designing the first dielectric multilayered film (anti-reflection film) 3, its structure was also decided by conducting a simulation so that a desired optical property was obtained, by using the number of stacked layers, a film thickness of the $TiO_2$ film, and a film thickness of the $SiO_2$ film of the first dielectric multilayered film as parameters. The total number of layers was 5 and the total film thickness was 0.25 μm.

(Evaluation of NIR Filters)

Regarding the obtained NIR filters 14 to 26, the transmittance ($T_0$) when the angle of incidence was 0° and the transmittance ($T_{30}$) when the angle of incidence was 30° were measured, and an area of a 550 nm to 750 nm wavelength range in a difference spectrum obtained by subtracting $T_{30}$ from $T_0$ (described as "area of $T_0$-$T_{30}$ (550 nm to 750 nm)") was calculated. Further, regarding each of the NIR filters 14 to 18 and the NIR filters 20 to 24, the obtained area of $T_0$-$T_{30}$ (550 nm to 750 nm) was divided by the area of $T_0$-$T_{30}$ (550 nm to 750 nm) of the NIR filter 25, whereby an area ratio to the filter not having the NIR absorbing layer was calculated. Similarly, regarding the NIR filter 19, an area ratio of the area of $T_0$-$T_{30}$ (550 nm to 750 nm) to that of the NIR filter 26 was calculated. Results of these are presented in Table 3 together with the structures and the average transmittances (an average transmittance for 400 nm to 550 nm and an average transmittance for 650 nm to 720 nm, in the transmittances ($T_0$)) of the NIR filters.

Figure 5:
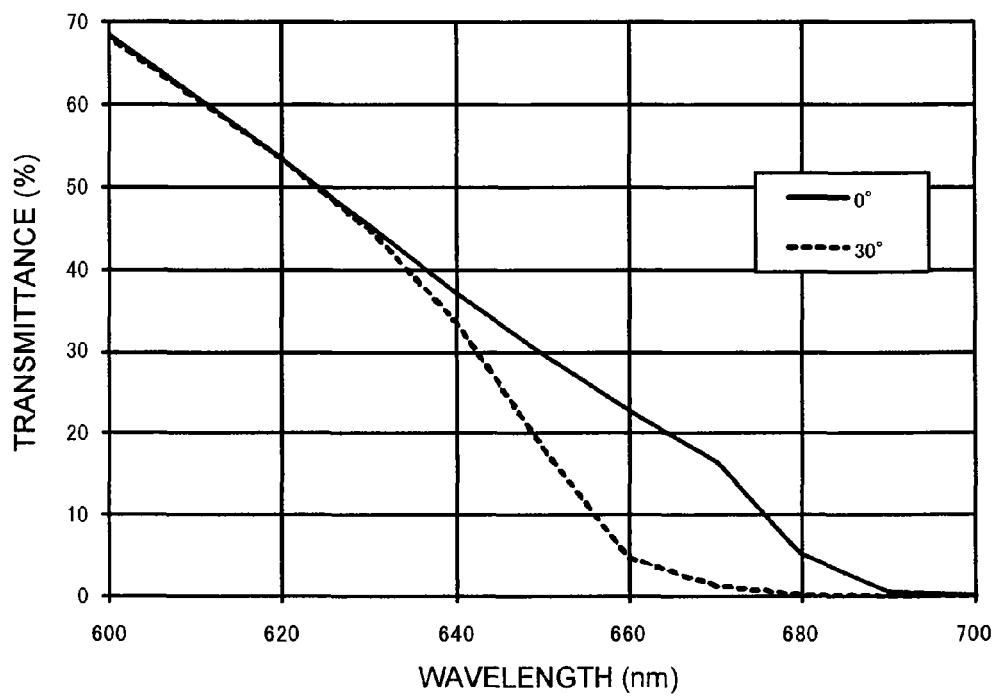
FIG. 5 is a chart illustrating how a transmission spectrum varies when light is radiated to the near-infrared cut filter of the example, with an angle of incidence being varied.
Figure 6:
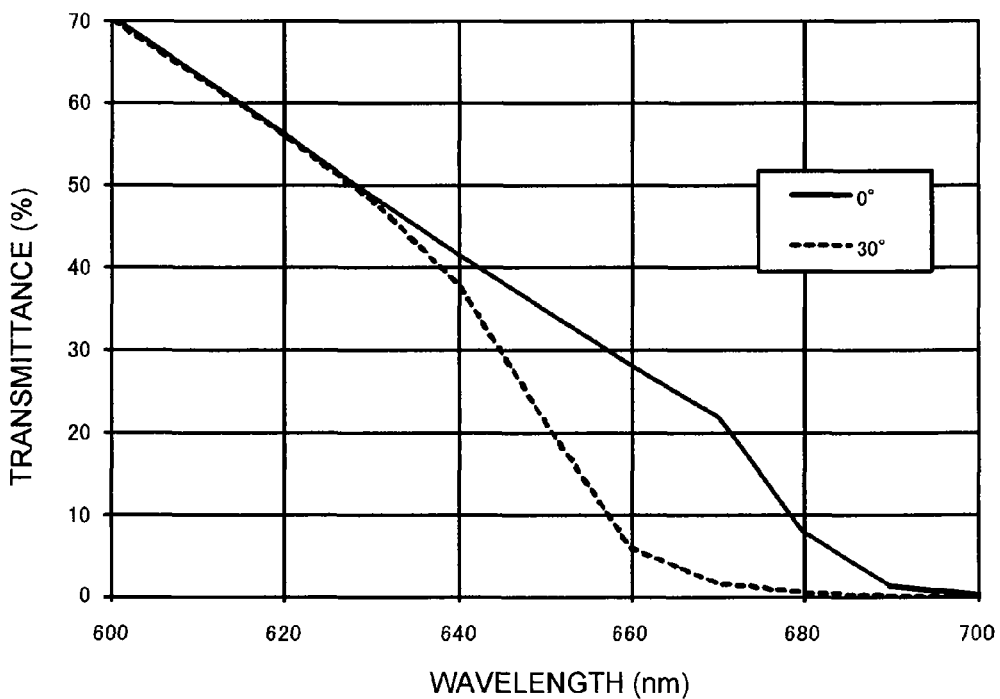
FIG. 6 is a chart illustrating how a transmission spectrum varies when light is radiated to a near infrared cut filter of a comparative example, with an angle of incidence being varied.

Incidentally, regarding the NIR filter 14 obtained in the example 14 and the NIR filter 25 obtained in the example 25, a 600 nm to 700 nm wavelength range in the transmittance spectra of the transmittance ($T_0$) and the transmittance ($T_{30}$) which are measured above are presented in FIG. 5 and FIG. 6 respectively. In FIG. 5 and FIG. 6, the spectrum of the transmittance ($T_0$) is indicated by the solid line and the spectrum of the transmittance ($T_{30}$) is indicated by the broken line, and an area of a region surrounded by the solid line and the broken line corresponds to the area of $T_0$-$T_{30}$ (550 nm to 750 nm).

TABLE 3

| | | NIR absorbing layer | | | | | | | | |
|---|---|---|---|---|---|---|---|---|---|---|
| | | NIR absorbing dye (A) | | | | second dielectric | | average | | |
| abbreviation of NIR filter | glass substrate | abbreviation of compound | part by mass (to 100 parts by mass of resin) | transparent resin (B) kind | refractive index | multilayered film (selected wavelength shielding layer) | first dielectric multilayered film (anti-reflection film) | transmittance of NIR cut filter (%) 400 nm to 550 nm | transmittance 650 nm to 720 nm | area of $T_0$-$T_{30}$ (550 nm to 750 nm) | area ratio (to filter without NIR absorbing layer) |
| E14 | 14 | NF50-E | (F11-2) | 0.6 | B-OKP2 | 1.63 | alternately stacked film of $TiO_2/SiO_2$ total number of layers: 52 film thickness: 6.6 μm | alternately stacked film of $TiO_2/SiO_2$ total number of layers: 5 film thickness: 0.25 μm | 84 | 12 | 562 | 0.78 |
| E15 | 15 | NF50-E | (F11-3) | 0.6 | B-OKP2 | 1.63 | | | 84 | 11 | 521 | 0.73 |
| E16 | 16 | NF50-E | (F12-1) | 1.0 | B-OKP2 | 1.63 | | | 84 | 8 | 405 | 0.56 |
| E17 | 17 | NF50-E | (F11-3) | 0.6 | PIBM | 1.48 | | | 84 | 9 | 418 | 0.58 |
| E18 | 18 | NF50-E | (F11-4) | 2.0 | SP3810 | 1.64 | | | 81 | 9 | 571 | 0.80 |
| E19 | 19 | NF50-EX | (F11-5) | 3.0 | B-OKP2 | 1.63 | | | 84 | 11 | 537 | 0.87 |
| E20 | 20 | NF50-E | S2084 | 2.5 | EA-F5003 | 1.59 | | | 85 | 8 | 345 | 0.48 |
| E21 | 21 | NF50-E | FB22 | 0.5 | VYLON 103 | 1.58 | | | 83 | 8 | 386 | 0.54 |
| E22 | 22 | NF50-E | ADS680HO | 2.0 | EA-F5003 | 1.59 | | | 84 | 10 | 481 | 0.67 |
| E23 | 23 | NF50-E | (F13-2) | 0.6 | B-OKP2 | 1.63 | | | 84 | 12 | 563 | 0.78 |
| E24 | 24 | NF50-E | (F12-1) (F11-2) | 4.5 0.9 | B-OKP2 | 1.63 | | | 84 | 8 | 512 | 0.71 |
| E25 | 25 | NF50-E | — | — | — | — | | | 85 | 15 | 718 | 1.00 |
| E26 | 26 | NF50-EX | — | — | — | — | | | 85 | 15 | 620 | 1.00 |

E14 to E26: Example 14 to Example 26

When slopes of absorption curves of the NIR filter 14 by the example 14 and the NIR filter 25 by the example 25 for light with a 630 nm to 700 nm wavelength are compared, it is seen from FIG. 5 and FIG. 6 that, in both of the cases of the transmittance ($T_0$) and the transmittance ($T_{30}$), the slope of the absorption curve of the NIR filter 14 for the light with the 630 nm to 700 nm wavelength is steep. Further, the area of $T_0$-$T_{30}$ (550 nm to 750 nm) of the NIR filter 14 is smaller than the relevant area of the NIR filter 25 and is 0.78 times as indicated in Table 3. It is seen from this that the NIR filter 14 by the example 14 is a NIR filter small in angle dependence on the angle of incidence and having a good near-infrared shielding property. Regarding the NIR filters 15 to 24 of the example 15 to the example 24 as well, it is seen from Table 3 that their area ratios are all 0.9 or less, and they are each a NIR filter small in angle dependence on the angle of incidence and having a good near-infrared shielding property, similarly to the NIR filter 14.

The NIR filter of the present invention has a good near-infrared shielding property and thus is useful for an imaging device such as a digital still camera, a display device such as a plasma display, and a glass window for vehicle (automobile or the like), a lamp, and so on.

What is claimed is:

1. A near-infrared cut filter comprising:
a near-infrared absorbing glass substrate made of CuO-containing fluorophosphate glass or CuO-containing phosphate glass; and
a near-infrared absorbing layer comprising a near-infrared absorbing dye and a transparent resin, and provided on at least one-principal surface of the near-infrared absorbing glass substrate, wherein the near-infrared absorbing film is a resin film in which the near-infrared absorbing dye is dispersed in the transparent resin, and an absorption spectrum of a 400 nm to 850 nm wavelength range of the resin film has a maximum absorption wavelength in a 650 nm to 750 nm wavelength range,
wherein in the near-infrared cut filter, an average value of a transmittance in a 400 nm to 550 nm wavelength range is 80% or more, and an average value of a transmittance in a 650 nm to 720 nm wavelength range is 15% or less.

2. The near-infrared cut filter according to claim 1, wherein a refractive index of the transparent resin is 1.45 or more.

3. The near-infrared cut filter according to claim 1, wherein the near-infrared absorbing dye is at least one selected from the group consisting of a cyanine-based compound, a phthalocyanine-based compound, a naphthalocyanine-based compound, a dithiol metal complex-based compound, a diimonium-based compound, a polymethine-based compound, a phthalide compound, a naphthoquinone-based compound, an anthraquinone-based compound, an indophenol-based compound, and a squarylium-based compound.

4. The near-infrared cut filter according to claim 3, wherein the near-infrared absorbing dye is the squarylium-based compound which is at least one selected from squarylium-based compounds expressed by the following formula (F1),

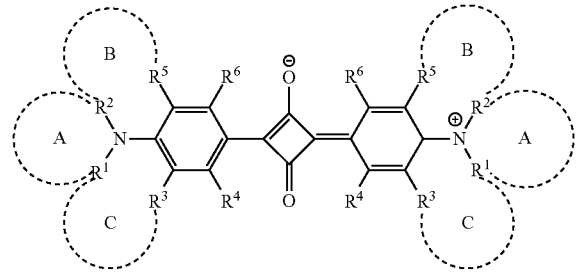

(F1)

where $R^4$s and $R^6$s each independently represent a hydrogen atom, a halogen atom, a hydroxyl group, an alkyl group or an alkoxy group each having 1 to 6 carbon atoms, an acyloxy group having 1 to 10 carbon atoms, or —$NR^7R^8$, where $R^7$ and $R^8$ are each independently a hydrogen atom, an alkyl group having 1 to 20 carbon atoms, or —C(=O)—$R^9$, where $R^9$ is a hydrogen atom, an alkyl group having 1 to 20 carbon atoms or an aryl group having 6 to 11 carbon atoms which may each have a substituent, or an alaryl group having 7 to 18 carbon atoms which may have a substituent and may have an oxygen atom between carbon atoms, where at least one pair of $R^1$ and $R^2$, $R^2$ and $R^5$, and $R^1$ and $R^3$ form a heterocycle A, a heterocycle B, and a heterocycle C, respectively, having 5 or 6 members including a nitrogen atom by coupling with each other, and when not forming the heterocycle, $R^1$ and $R^2$ each independently represent a hydrogen atom, an alkyl group or an allyl group each having 1 to 6 carbon atoms which may have a substituent, or an aryl group or an alaryl group each having 6 to 11 carbon atoms, and when not forming the heterocycle, $R^3$ and $R^5$ each independently represent a hydrogen atom, a halogen atom, or an alkyl group or an alkoxy group each having 1 to 6 carbon atoms.

5. The near-infrared cut filter according to claim 3, wherein the near-infrared absorbing dye is the squarylium-based compound which is at least one selected from squarylium-based compounds expressed by the following formula (F11),

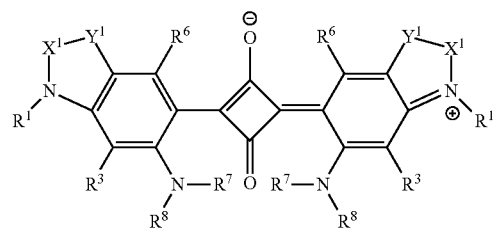

(F11)

where $R^1$s each independently represent a hydrogen atom, an alkyl group or an allyl group each having 1 to 6 carbon atoms which may have a substituent, or an aryl group or an alaryl group each having 6 to 11 carbon atoms, $R^3$s each independently represent a hydrogen atom, a halogen atom, or an alkyl group or an alkoxy group each having 1 to 6 carbon atoms, $R^6$s each independently represent a hydrogen atom, a halogen atom, a hydroxyl group, an alkyl group or an alkoxy group each having 1 to 6 carbon atoms, or an acyloxy group having 1 to 10 carbon atoms, $R^7$s and $R^8$s each independently represent a hydrogen atom, an alkyl group having 1 to 20 carbon atoms, or —C(=O)—$R^9$, where $R^9$ is a hydrogen atom, an alkyl group having 1 to 20 carbon atoms or an aryl group having 6 to 11 carbon atoms which each may have a substituent, or an alaryl group having 7 to 18 carbon atoms which may have a substituent and may have an oxygen atom between carbon atoms, $X^1$s are each independently a group expressed by the following formula (1x) or (2x), and $Y^1$s are each independently single bond or one of groups expressed by the following formulas (1y) to (5y),

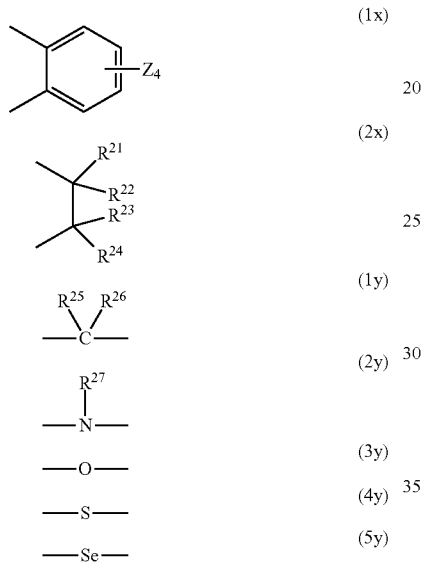

where in the formula (1x), four Zs each independently represent a hydrogen atom, a hydroxyl group, an alkyl group or an alkoxy group each having 1 to 6 carbon atoms, or —$NR^{28}R^{29}$, where $R^{28}$ and $R^{29}$ each independently represent a hydrogen atom or an alkyl group having 1 to 20 carbon atoms, $R^{21}$ to $R^{26}$ each independently represent a hydrogen atom, an alkyl group having 1 to 6 carbon atoms, or an aryl group having 6 to 10 carbon atoms, and $R^{27}$ represents an alkyl group having 1 to 6 carbon atoms or an aryl group having 6 to 10 carbon atoms.

6. The near-infrared cut filter according to claim 1, wherein an amount of the near-infrared absorbing dye is 0.1 to 20 parts by mass with respect to 100 parts by mass of the transparent resin.

7. The near-infrared cut filter according to claim 1, further comprising:
one or more dielectric multilayered films provided on at least one of a surface of the near-infrared absorbing layer and a surface of the near-infrared absorbing glass substrate, wherein each of the one or more dielectric multilayered films comprises high-refractive-index dielectric films and low-refractive-index dielectric films which are alternately stacked.

8. The near-infrared cut filter according to claim 7, wherein in at least one of the one or more dielectric multilayered films, a transmittance in a 420 nm to 650 nm wavelength range is 90% or more, a transmittance in a 750 nm to 1100 nm wavelength range is 10% or less, and a shortest wavelength, for which a transmittance is 50% in a wavelength range longer than 600 nm, exists in a wavelength range of over 650 nm and 730 nm or less.

9. A solid-state imaging device comprising:
the near-infrared cut filter according to claim 1, and
a solid-state image sensor,
the near-infrared cut filter and the solid-state image sensor being disposed in order from a side where light of a light source enters.

10. The near-infrared cut filter according to claim 7, wherein each of the high-refractive-index dielectric films has a refractive index of not less than 2.2 and not more than 2.5, and each of the low-refractive-index dielectric films has a refractive index of 1.45 or more and less than 1.55.

11. The near-infrared cut filter according to claim 10, wherein the high-refractive-index dielectric film comprises $TiO_2$ and the low-refractive-index dielectric film comprises $SiO_2$.

12. The near-infrared cut filter according to claim 8, wherein a difference spectrum ratio represented by the following formula is 0.9 or less:

$$\text{the difference spectrum ratio} = \frac{\text{an area of a 550 nm to 780 nm wavelength range in a first difference spectrum}}{\text{an area of a 550 nm to 780 nm wavelength range in a second difference spectrum}}$$

wherein the first difference spectrum is a subtraction of a transmittance of the near-infrared cut filter when an incident angle is 30° from a transmittance of the near-infrared cut filter when an incident angle is 0°, and the second difference spectrum is a subtraction of a transmittance of a hypothetical filter when an incident angle is 30° from a transmittance of the hypothetical filter when an incident angle is 0°, wherein the hypothetical filter is identical to the near-infrared cut filter except for not comprising the near-infrared absorbing layer.

13. The near-infrared cut filter according to claim 7, wherein the one or more dielectric multilayered films comprise:
a first dielectric multilayered film provided on the near-infrared absorbing layer and
a second dielectric multilayered film provided on a principal surface of the near-infrared absorbing glass substrate, the principal surface being opposite to the principal surface on which the near-infrared absorbing layer is provided.

14. The near-infrared cut filter according to claim 13, wherein the first dielectric multilayered film is an anti-reflection film.

15. The near-infrared cut filter according to claim 13, wherein a transmittance of the second dielectric multilayered film is 1% or less for light in a wavelength range of 400 nm or less.

16. The near-infrared cut filter according to claim 1, wherein a thickness of the near-infrared absorbing glass substrate is from 0.03 to 5 mm.

17. The near-infrared cut filter according to claim 1,
wherein a transmittance of the near-infrared absorbing glass substrate is 80% or more for light in a wavelength range of from 400 nm to 550 nm, and is 40% or less for light in a wavelength range of from 750 nm to 1000 nm.

18. The near-infrared cut filter according to claim 1,
wherein a thickness of the near-infrared absorbing layer is from 0.1 to 100 μm.

19. The near-infrared cut filter according to claim 1,
wherein the near-infrared absorbing layer further comprises an ultraviolet absorbent.

20. The near-infrared cut filter according to claim 19,
wherein the ultraviolet absorbent is at least one selected from the group consisting of a benzotriazole-based ultraviolet absorbent, a benzophenone-based ultraviolet absorbent, a salicylate-based ultraviolet absorbent, a cyanoacrylate-based ultraviolet absorbent, a triazine-based ultraviolet absorbent, an okizanirido-based ultraviolet absorbent, a nickel complex salt-based ultraviolet absorbent, and an inorganic ultraviolet absorbent.

21. The near-infrared cut filter according to claim 1, further comprising a light shielding member in a black frame shape disposed on an end portion of a principal surface of the near-infrared cut filter.

22. A near-infrared cut filter comprising:
a near-infrared absorbing glass substrate made of CuO-containing fluorophosphate glass or CuO-containing phosphate glass;
a near-infrared absorbing layer comprising a near-infrared absorbing dye and a transparent resin, on at least one principal surface of the near-infrared absorbing glass substrate; and
one or more dielectric multilayered films provided on at least one of a surface of the near-infrared absorbing layer and a surface of the near-infrared absorbing glass substrate, each of the one or more dielectric multilayered films comprising high-refractive-index dielectric films and low-refractive-index dielectric films which are alternately stacked,
wherein in the near-infrared cut filter, an average value of a transmittance in a 400 nm to 550 nm wavelength range is 80% or more, and an average value of a transmittance in a 650 nm to 720 nm wavelength range is 15% or less.

23. The near-infrared cut filter according to claim 22,
wherein each of the high-refractive-index dielectric films has a refractive index of not less than 2.2 and not more than 2.5, and each of the low-refractive-index dielectric films has a refractive index of 1.45 or more and less than 1.55.

24. The near-infrared cut filter according to claim 23,
wherein the high-refractive-index dielectric film comprises $TiO_2$ and the low-refractive-index dielectric film comprises $SiO_2$.

25. The near-infrared cut filter according to claim 22,
wherein a refractive index of the transparent resin is 1.45 or more.

26. The near-infrared cut filter according to claim 22,
wherein an amount of the near-infrared absorbing dye is 0.1 to 20 parts by mass with respect to 100 parts by mass of the transparent resin.

27. The near-infrared cut filter according to claim 22,
wherein in at least one of the one or more dielectric multilayered films, a transmittance in a 420 nm to 650 nm wavelength range is 90% or more, a transmittance in a 750 nm to 1100 nm wavelength range is 10% or less, and a shortest wavelength, for which a transmittance is 50% in a wavelength range longer than 600 nm, exists in a wavelength range of over 650 nm and 730 nm or less.

28. The near-infrared cut filter according to claim 27,
wherein a difference spectrum ratio represented by the following formula is 0.9 or less:

$$\text{the difference spectrum ratio} = \frac{\text{an area of a 550 nm to 780 nm wavelength range in a first difference spectrum}}{\text{an area of a 550 nm to 780 nm wavelength range in a second difference spectrum}}$$

wherein the first difference spectrum is a subtraction of a transmittance of the near-infrared cut filter when an incident angle is 30° from a transmittance of the near-infrared cut filter when an incident angle is 0°, and the second difference spectrum is a subtraction of a transmittance of a hypothetical filter when an incident angle is 30° from a transmittance of the hypothetical filter when an incident angle is 0°, wherein the hypothetical filter is identical to the near-infrared cut filter except for not comprising the near-infrared absorbing layer.

29. The near-infrared cut filter according to claim 22,
wherein a thickness of the near-infrared absorbing layer is from 0.1 to 100 μm.

30. A solid-state imaging device comprising:
the near-infrared cut filter according to claim 22, and
a solid-state image sensor,
the near-infrared cut filter and the solid-state image sensor being disposed in order from a side where light of a light source enters.

* * * * *